United States Patent [19]

Blair

[11] 3,742,449

[45] June 26, 1973

[54] BURST AND SINGLE ERROR DETECTION AND CORRECTION SYSTEM

[75] Inventor: Charles M. Blair, Dallas, Tex.

[73] Assignee: Texas Instruments Incorporated, Dallas, Tex.

[22] Filed: June 14, 1971

[21] Appl. No.: 152,824

[52] U.S. Cl. .................................... 340/146.1 AL

[51] Int. Cl. .......................................... G06f 11/12

[58] Field of Search ................ 340/146.1 AL, 172.5

[56] References Cited

UNITED STATES PATENTS

| | | | |
|---|---|---|---|
| 3,487,362 | 12/1969 | Frey | 340/146.1 AL |
| 3,123,803 | 3/1964 | De Lisle et al. | 340/146.1 AL |
| 3,222,643 | 12/1965 | Klinkhamer | 340/146.1 AL |
| 3,418,630 | 12/1968 | Van Duuren | 340/146.1 AL |
| 3,478,313 | 11/1969 | Srinivasan | 340/146.1 AL |
| 3,542,756 | 11/1970 | Gallager | 340/146.1 AL |
| 3,544,963 | 12/1970 | Tong | 340/146.1 AL |

*Primary Examiner*—Charles E. Atkinson

*Attorney*—Harold Levine, James T. Comfort et al.

[57] ABSTRACT

A data communication system has a source of data. The data is divided into data segments. When a burst error is indicated, the location of the burst error is determined and the burst error is corrected. After the burst error has been corrected, the data segment is checked for single bit errors.

5 Claims, 38 Drawing Figures

PATENTED JUN 26 1973

3,742,449

SHEET 01 OF 26

Inventor:
Charles M. Blair
Attorney:

PATENTED JUN 26 1973

3,742,449

SHEET 04 OF 26

SHIFT COUNTER

| $B_0$ | $B_1$ | $B_2$ | $B_3$ | $B_4$ | $B_5$ | $B_6$ | $B_7$ | $B_8$ | $B_9$ | | |
|---|---|---|---|---|---|---|---|---|---|---|---|
| 0 | 0 | 0 | 0 | 0 | 0 | 0 | 0 | 0 | 0 | = | SCNTREQZ |
| 0 | 0 | 1 | 0 | 0 | 0 | 0 | 1 | 0 | 0 | = | SC511 |
| 0 | 0 | 0 | 1 | 1 | 0 | 1 | 0 | 1 | 0 | = | SC527 |
| 1 | 1 | 1 | 1 | 1 | 0 | 0 | 1 | 1 | 1 | = | SC537 |

PARITY BIT RELATIONSHIP $D_0 \oplus D_{16} \oplus D_{32} \oplus D_{48} \oplus D_{64}$ ----- = $P_0$

PATENTED JUN 26 1973

3,742,449

SHEET 09 OF 26

C1
C2
WFD-
WFP-

5 ATBCINC = TDE·TFARMI·BLC1T9-·BCEQ2-
7 ATBESALD = ATBCINC·ATBCB0/Q-
ATBLCINC = ATBESALD + BLCEQ15-·BLCEQZ-·TFARMI

ENABLED AT (READ FILLING • SC538P • CWGERR • BLC = 0)

$JB0/Q_n = RMID \oplus B9/Q_{n-1}$
$B1/Q_n = B0/Q_{n-1}$
$B2/Q_n = B1/Q_{n-1}$
$JB3/Q_n = B2/Q_{n-1} \oplus B9/Q_{n-1}$
$B4/Q_n = B3/Q_{n-1}$
$B5/Q_n = B4/Q_{n-1}$
$B6/Q_n = B5/Q_{n-1}$
$B7/Q_n = B6/Q_{n-1}$
$B8/Q_n = B7/Q_{n-1}$
$B9/Q_n = B8/Q_{n-1}$ $B3/Q_{SCO} = B2/Q_{538} \oplus B9/Q_{538}$ $B0/SCO = RMID_{538} \oplus B9/Q_{538}$

DURING READ – DUMPING RMID = 0

BURST AND SINGLE ERROR DETECTION AND CORRECTION SYSTEM

This invention is specifically directed to memory systems and particularly directed to a single error detection and correction system for memory systems.

The detection of errors upon the transmission of data to and from a memory system has been a problem since the inception of digital systems. Parity error detection in itself has been used almost from the inception of such digital systems. For instance, Hamming codes have been used extensively since 1950. Also placing vertical parity on a separate track and inserting longitudinal parity after the data message is standard practice on magnetic tapes.

It is therefore an object of this invention to provide a new and improved error detection and correction system for memory systems.

Another object of this invention is to provide a new and improved burst and single error and correction system for memory systems.

IN THE DRAWINGS

FIG. 1 is a block diagram of the track buffer processor.

FIG. 2, comprised of FIGS. 2*a* – 2*f*, illustrates the logic used in designing the processor.

Figure 12A:
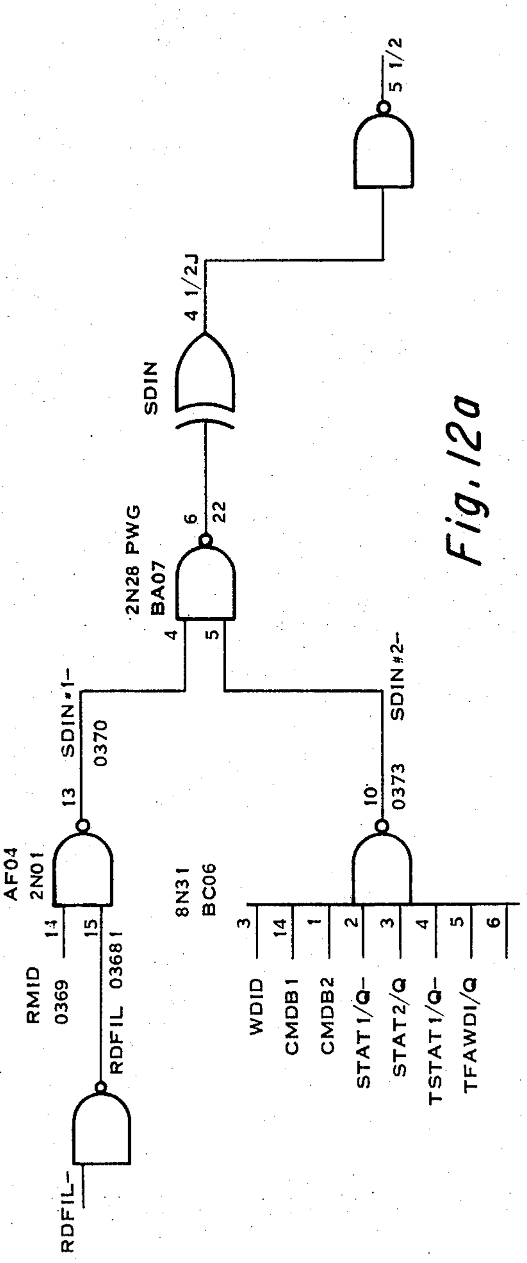
Figure 12B:
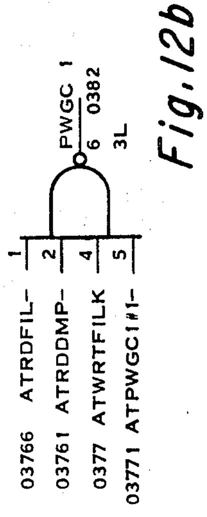
Figure 12C:
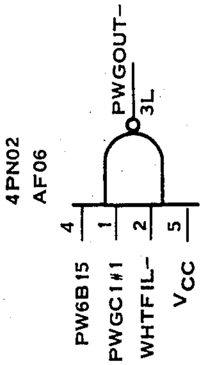

FIGS. 12*a*–12*c* show parity word generator controls.

FIGS. 13*a*–13*d* show the check word generator.

Figure 14:
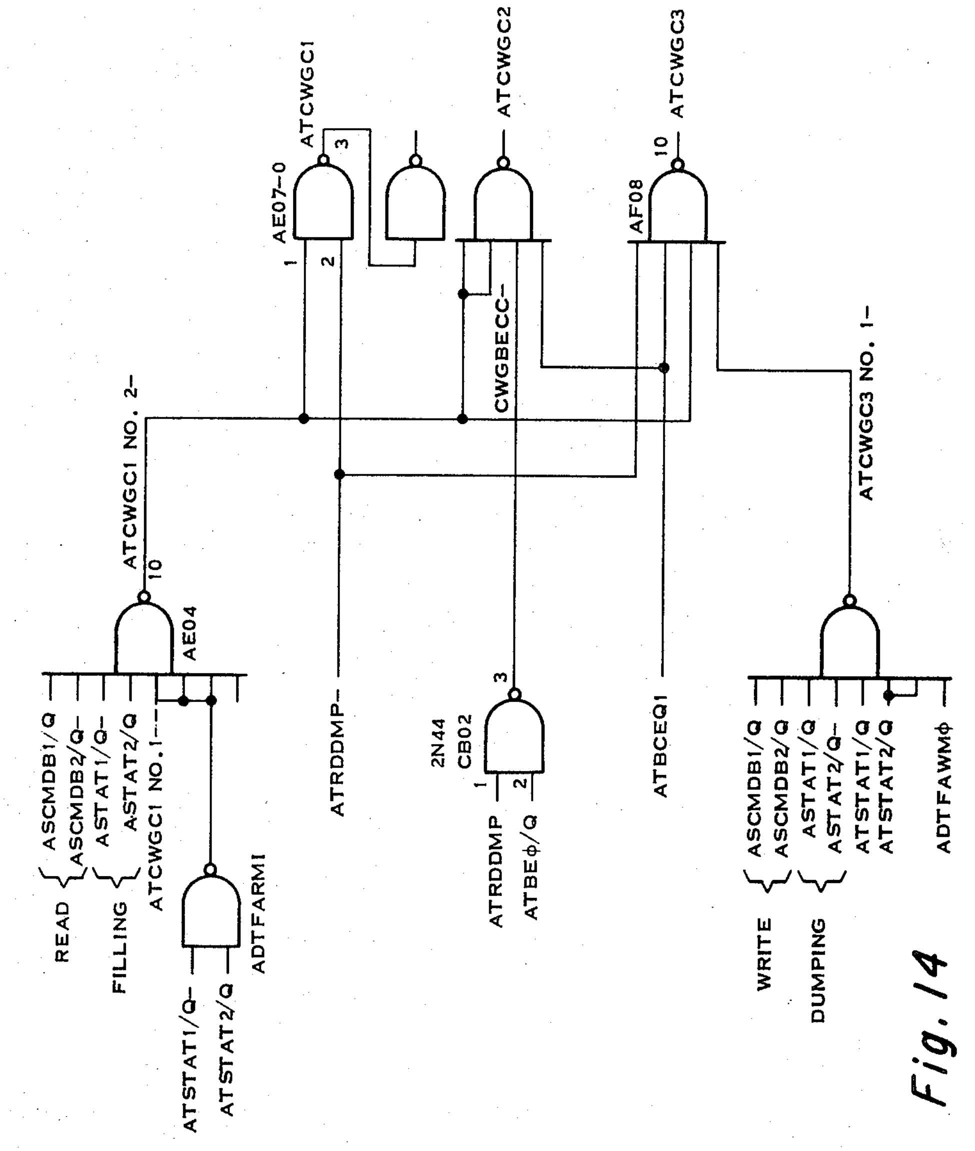

FIG. 14 shows the check word generator control.

Figures 15, 16:
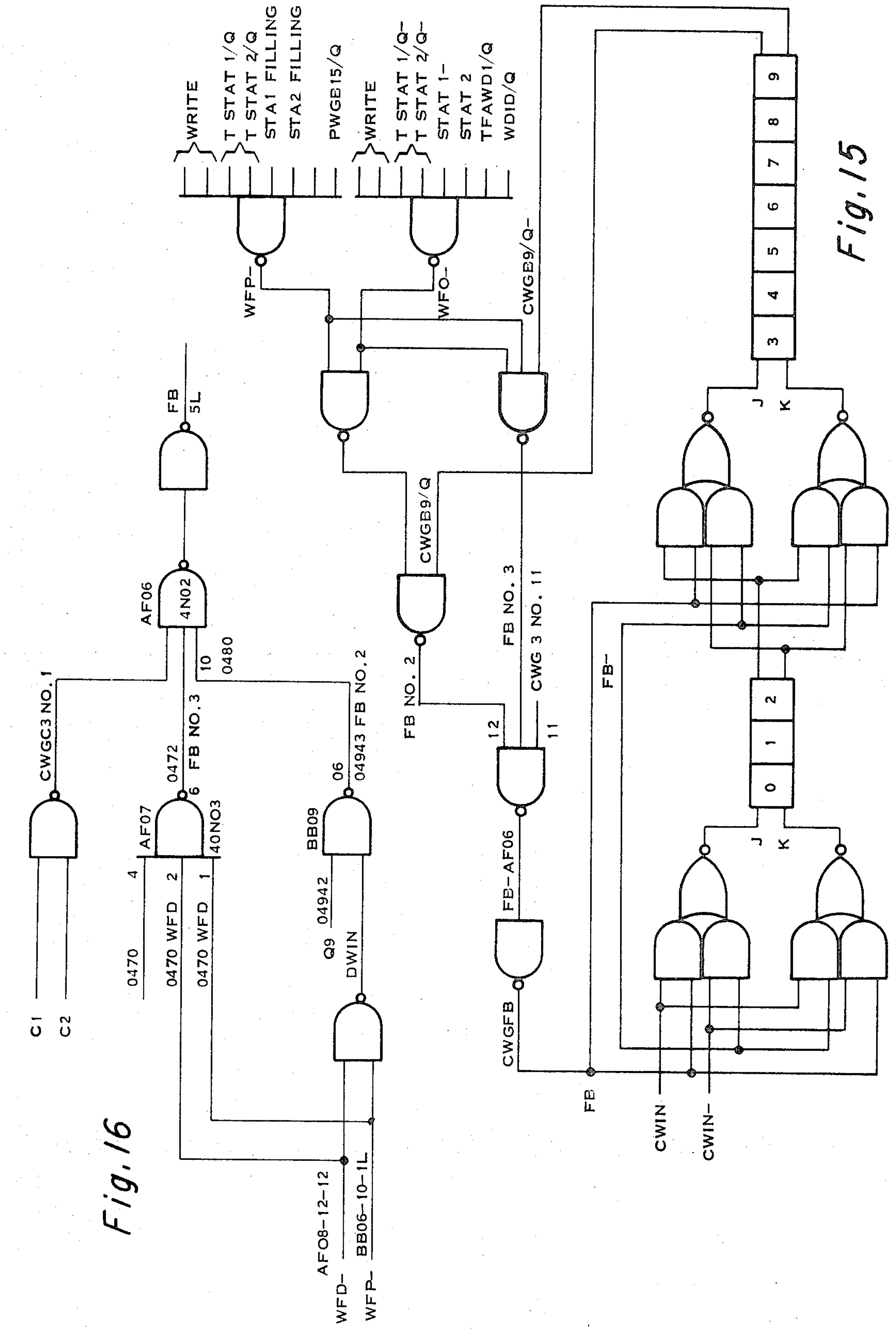

FIG. 15 shows check word generator register controls.

FIG. 16 shows the generation of the feedback term.

Figure 17:
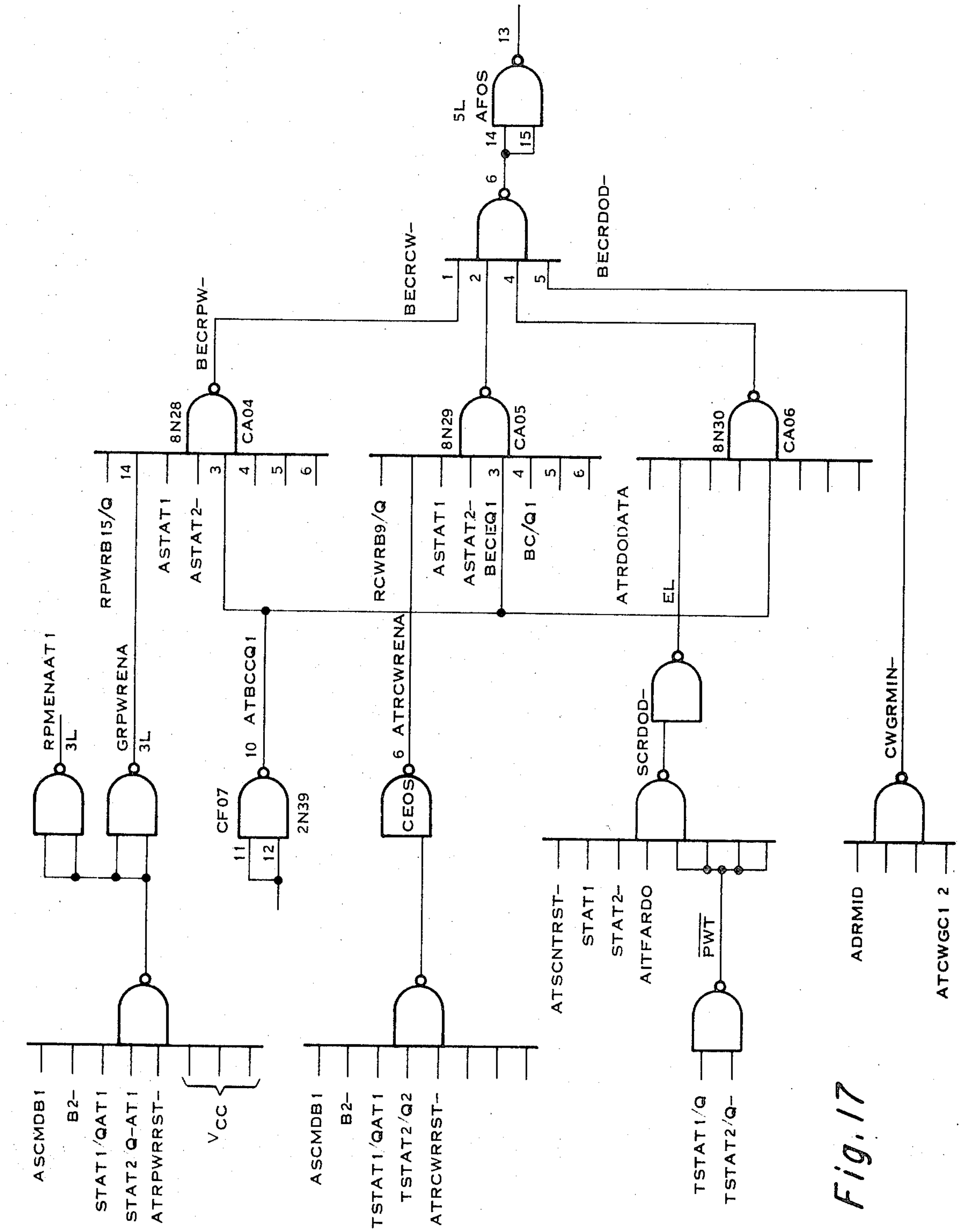

FIG. 17 shows the input to the check word generator.

Figure 18:
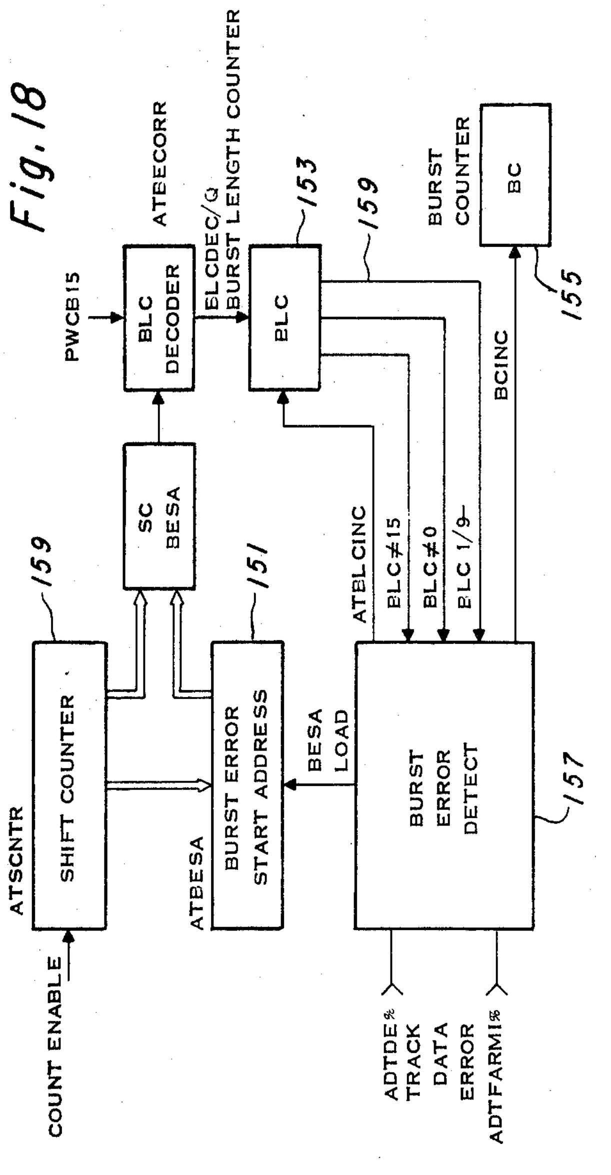

FIG. 18 shows the burst error correction logic.

Figure 19:
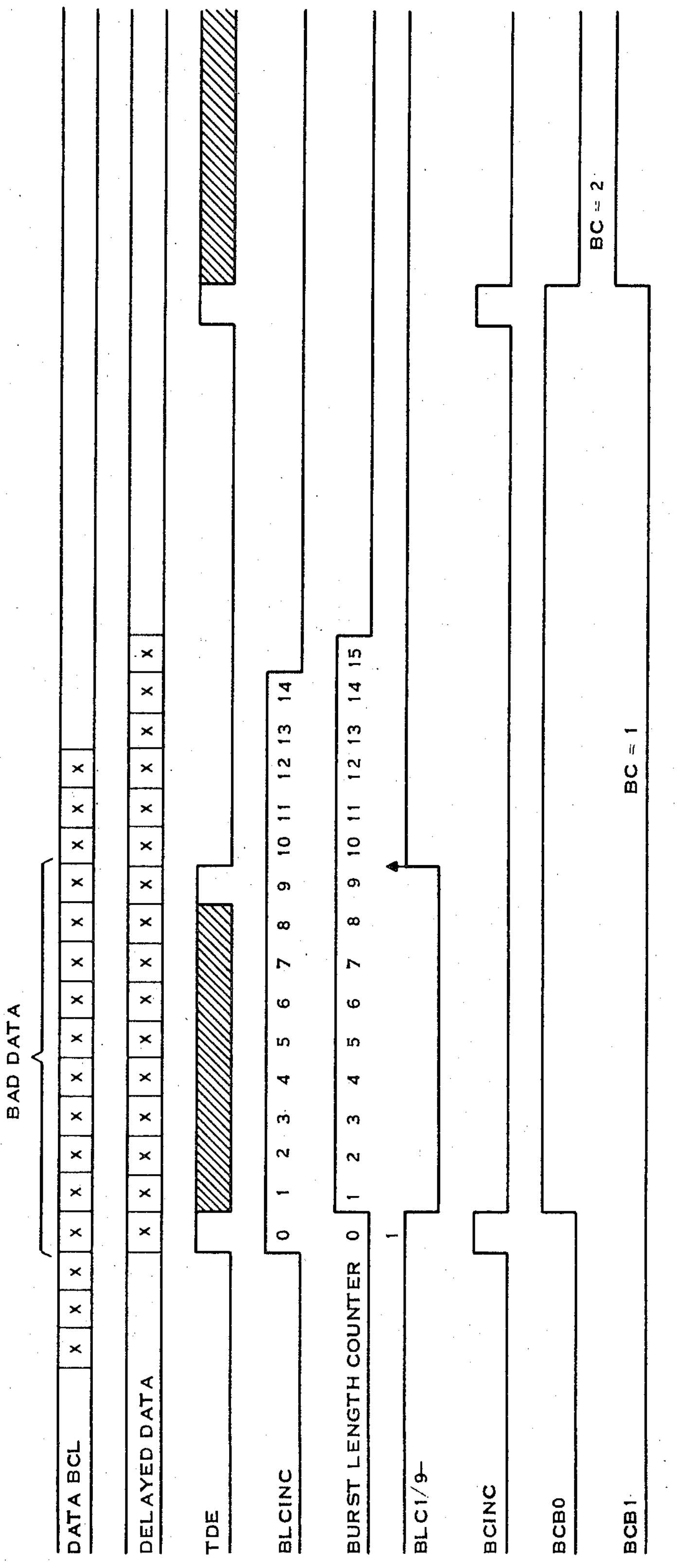

FIG. 19 shows the timing for the track data error detection.

Figure 20:
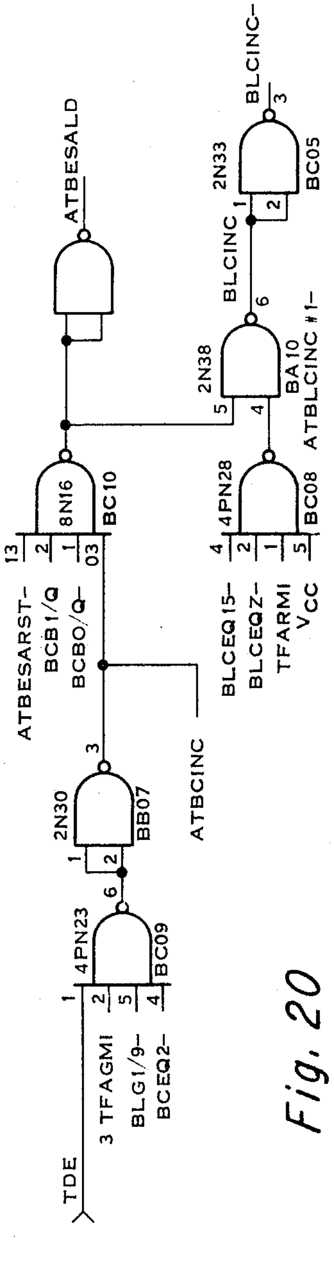

FIG. 20 shows the generation of the burst error start address load signal.

Figure 21:
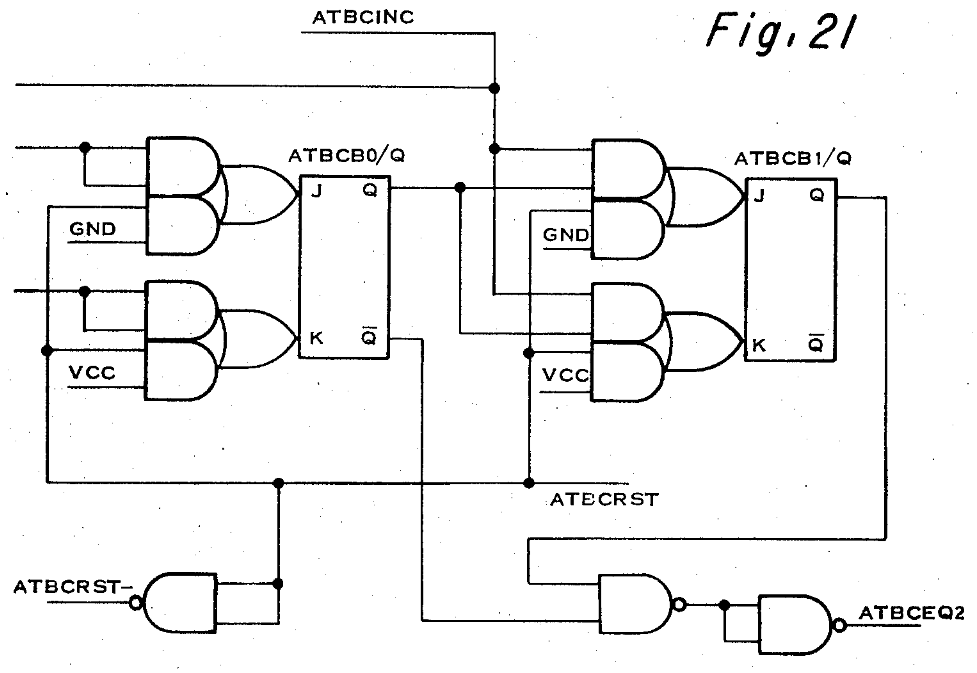

FIG. 21 shows the burst counter.

Figure 22:
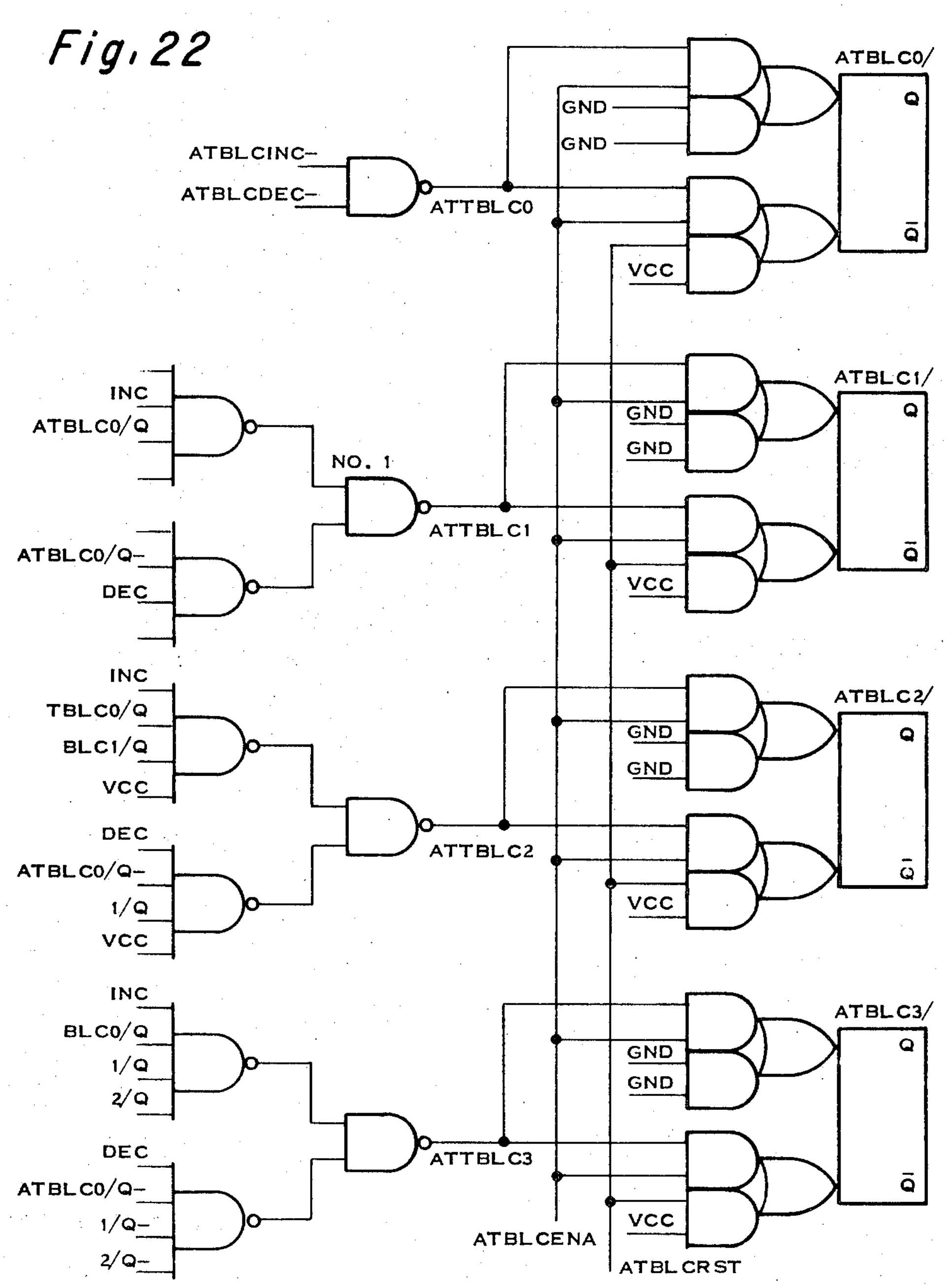

FIG. 22 shows the burst length counter.

Figure 23:
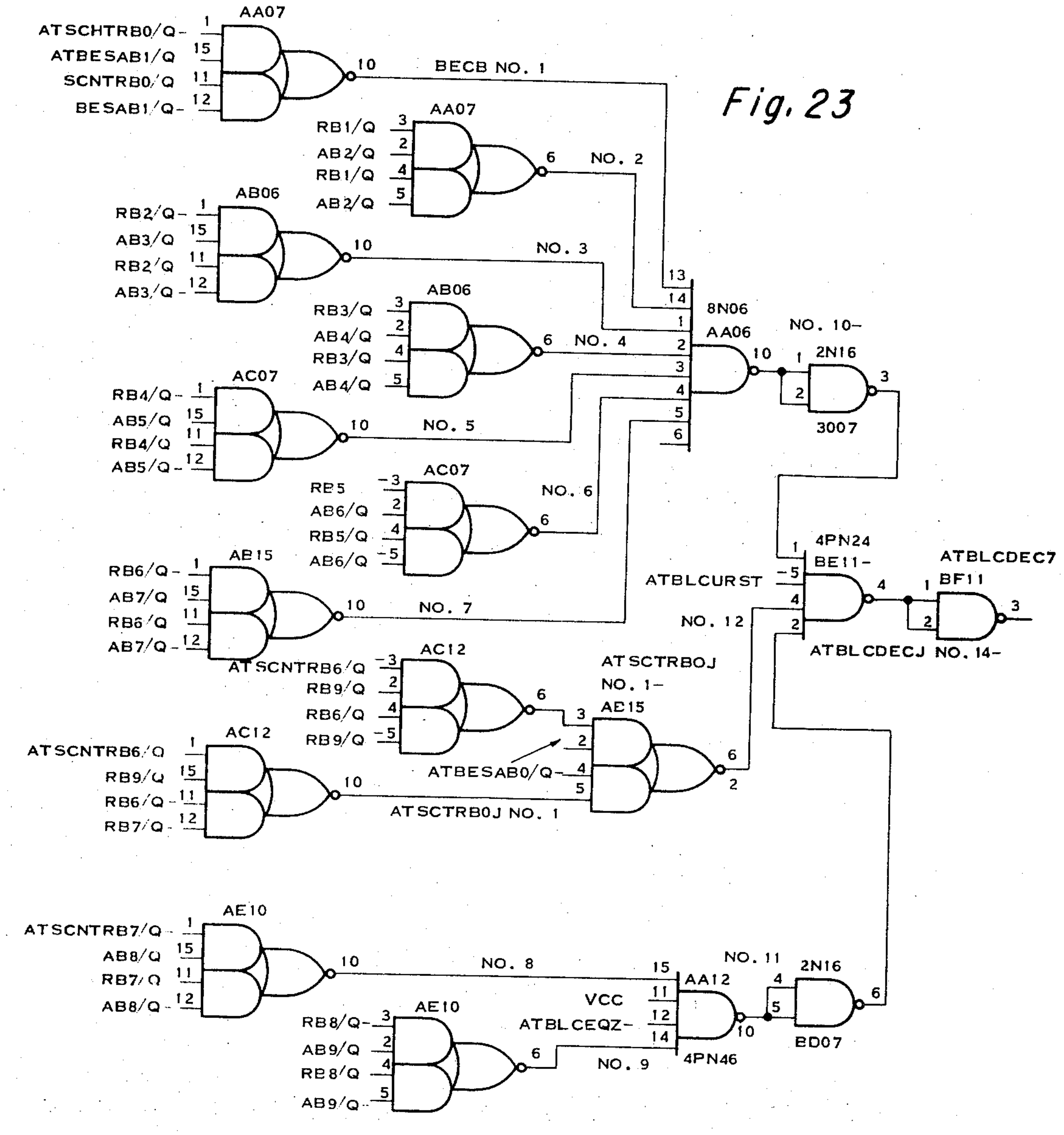

FIG. 23 shows a comparison circuit.

Figure 24:
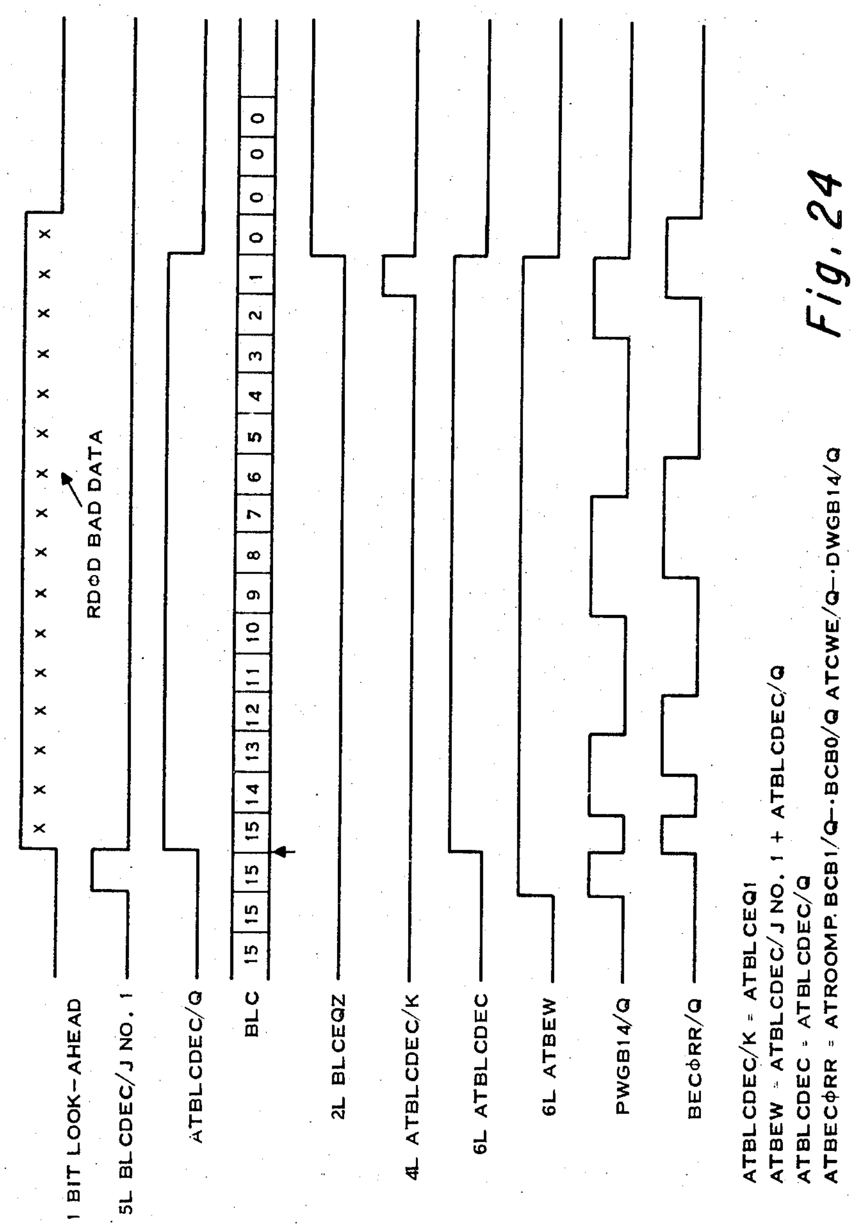

FIG. 24 shows the timing diagram.

Figures 25, 26:
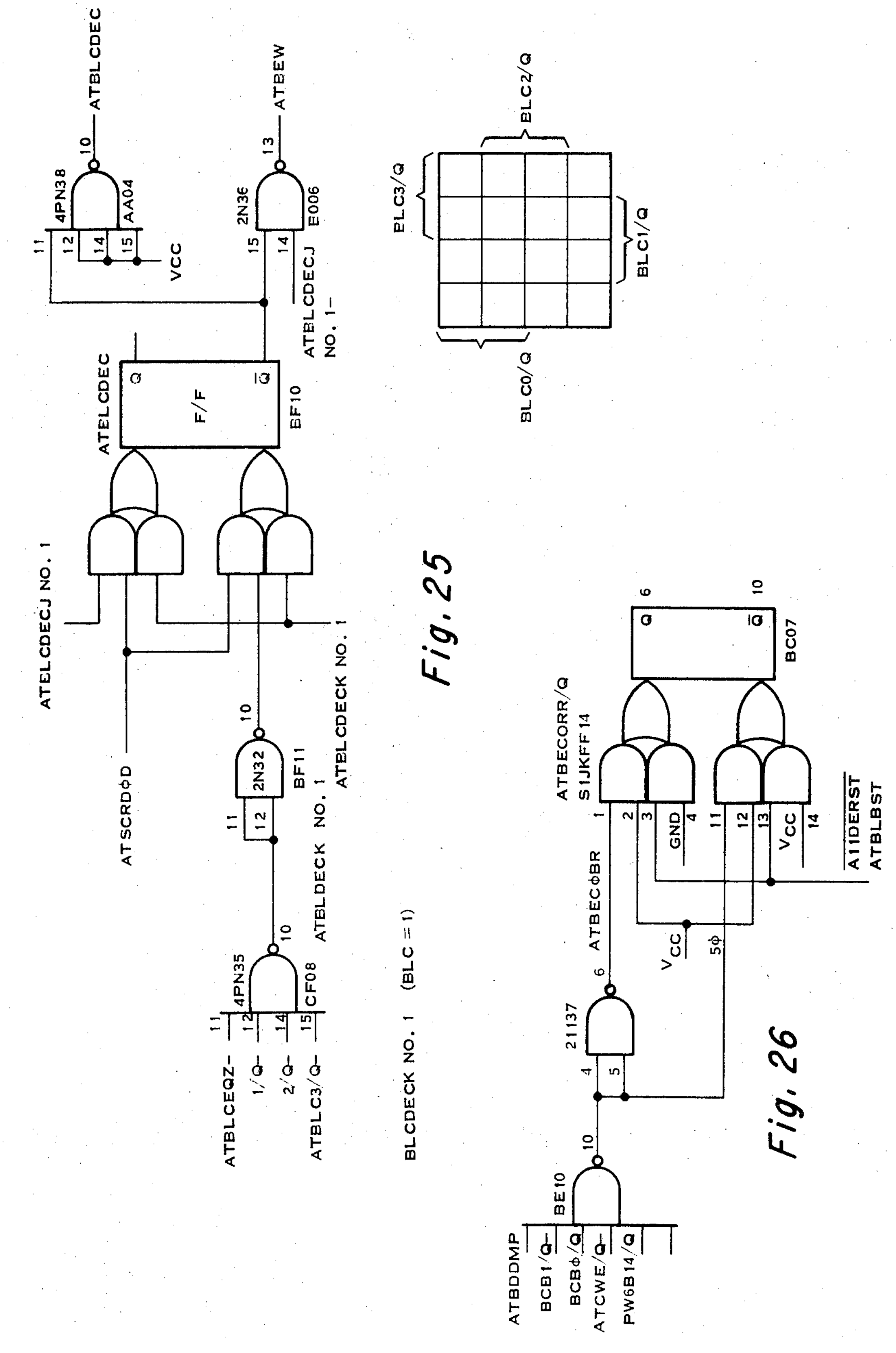

FIG. 25 shows the logic for the comparison between the shift counter and the burst error start address register.

FIG. 26 shows the burst error correction flip-flop.

Figure 27:
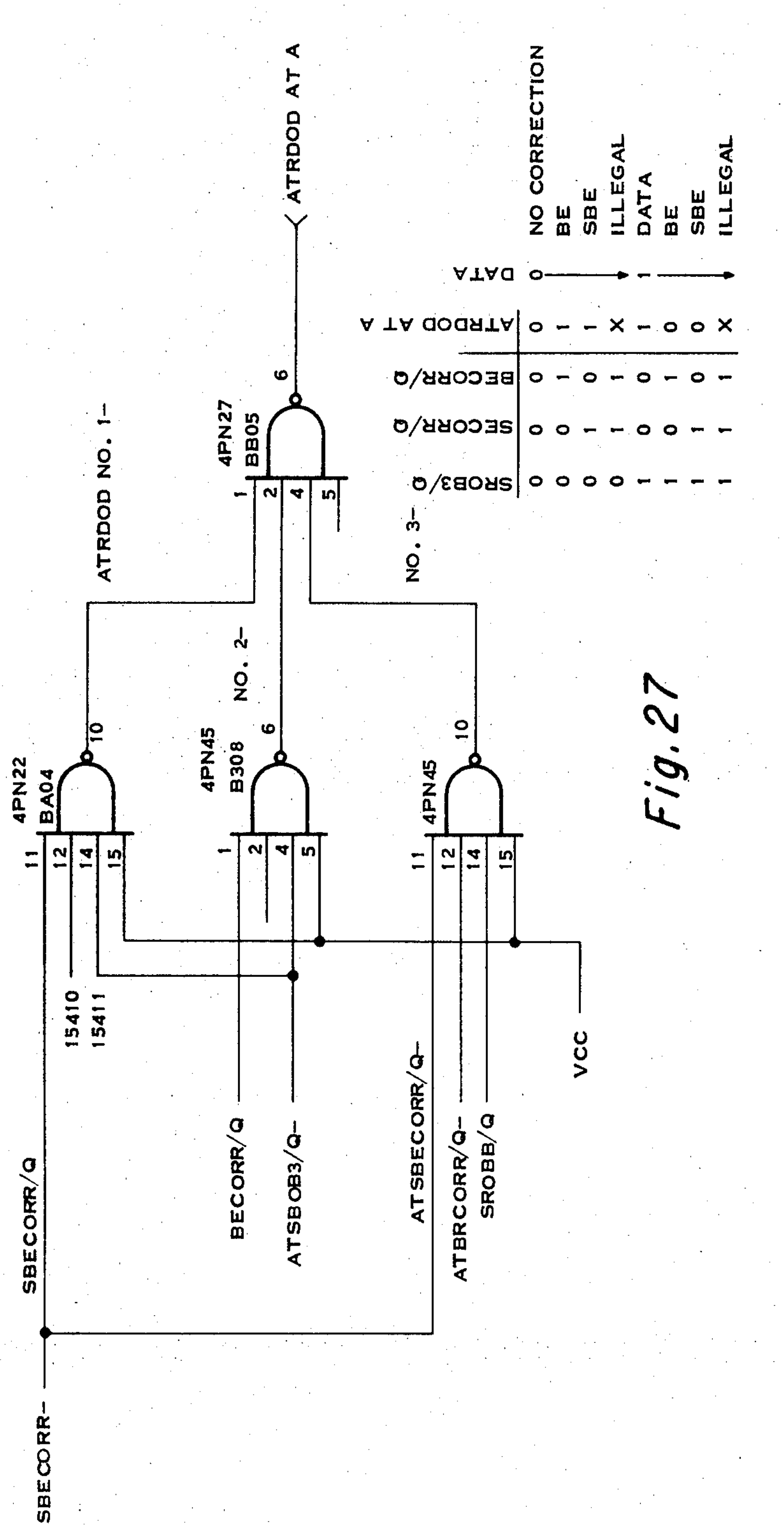

FIG. 27 shows the control for the read register.

Figure 28:
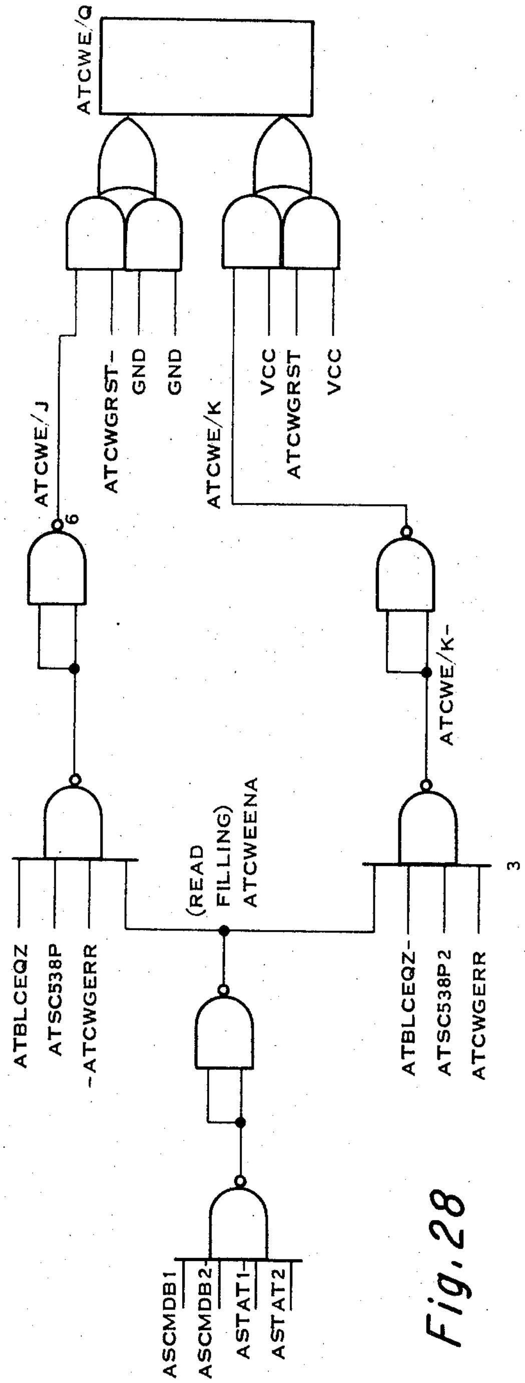

FIG. 28 shows the check word error flip-flop.

Figure 29:
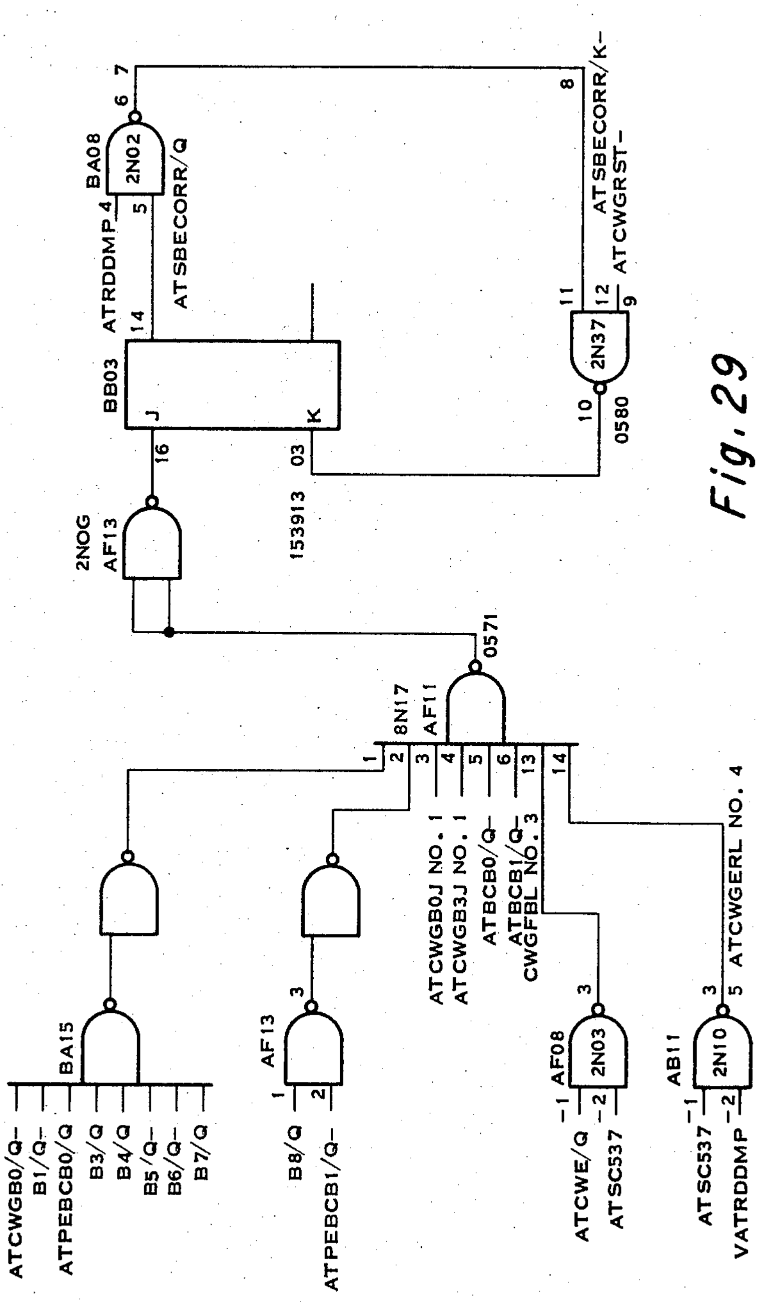

FIG. 29 shows the single bit error correction flip-flop.

Figure 30:
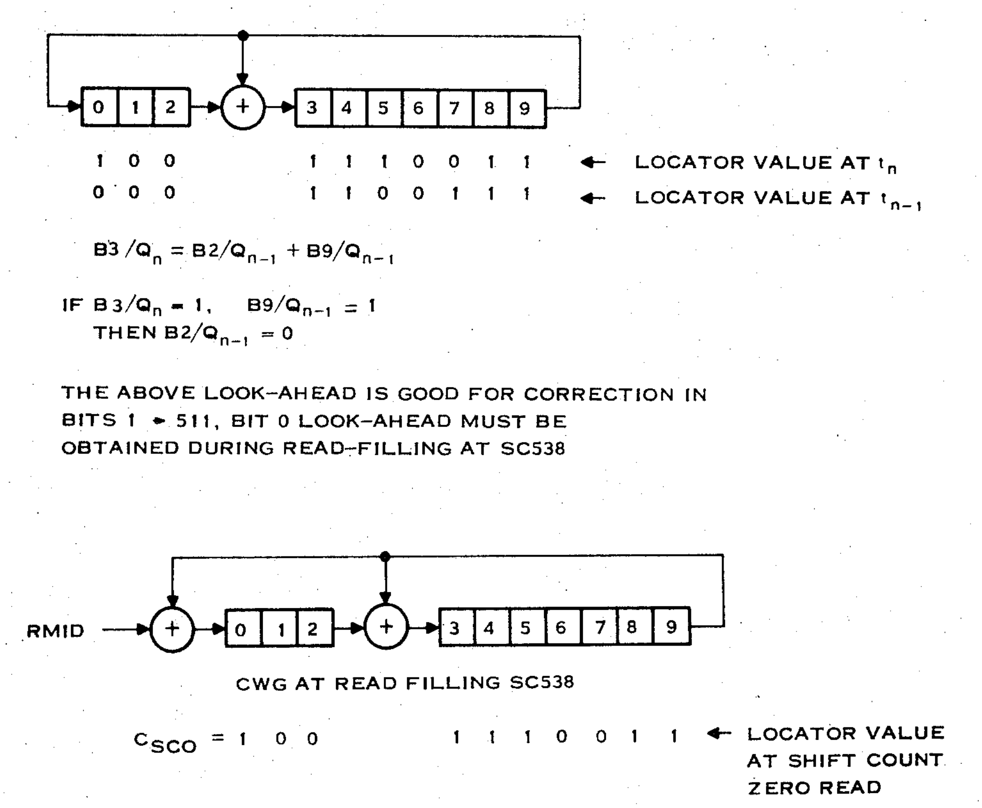

FIG. 30 shows the error locator with look-ahead for single bit error correction.

Figure 31:
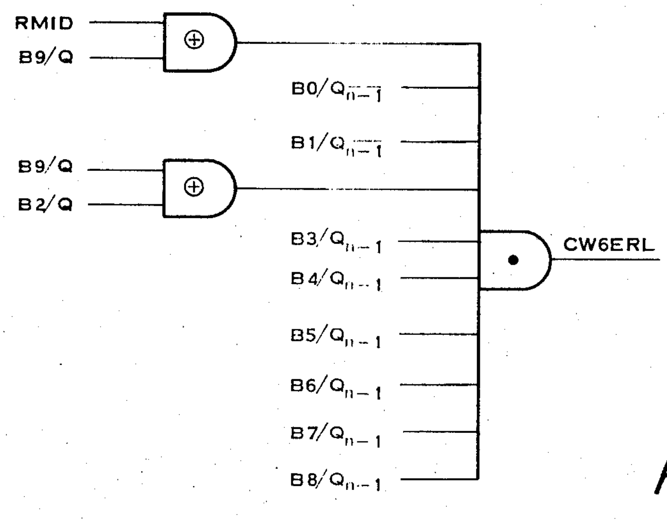

FIG. 31 shows the check word generator error locator implementation.

Figure 32:
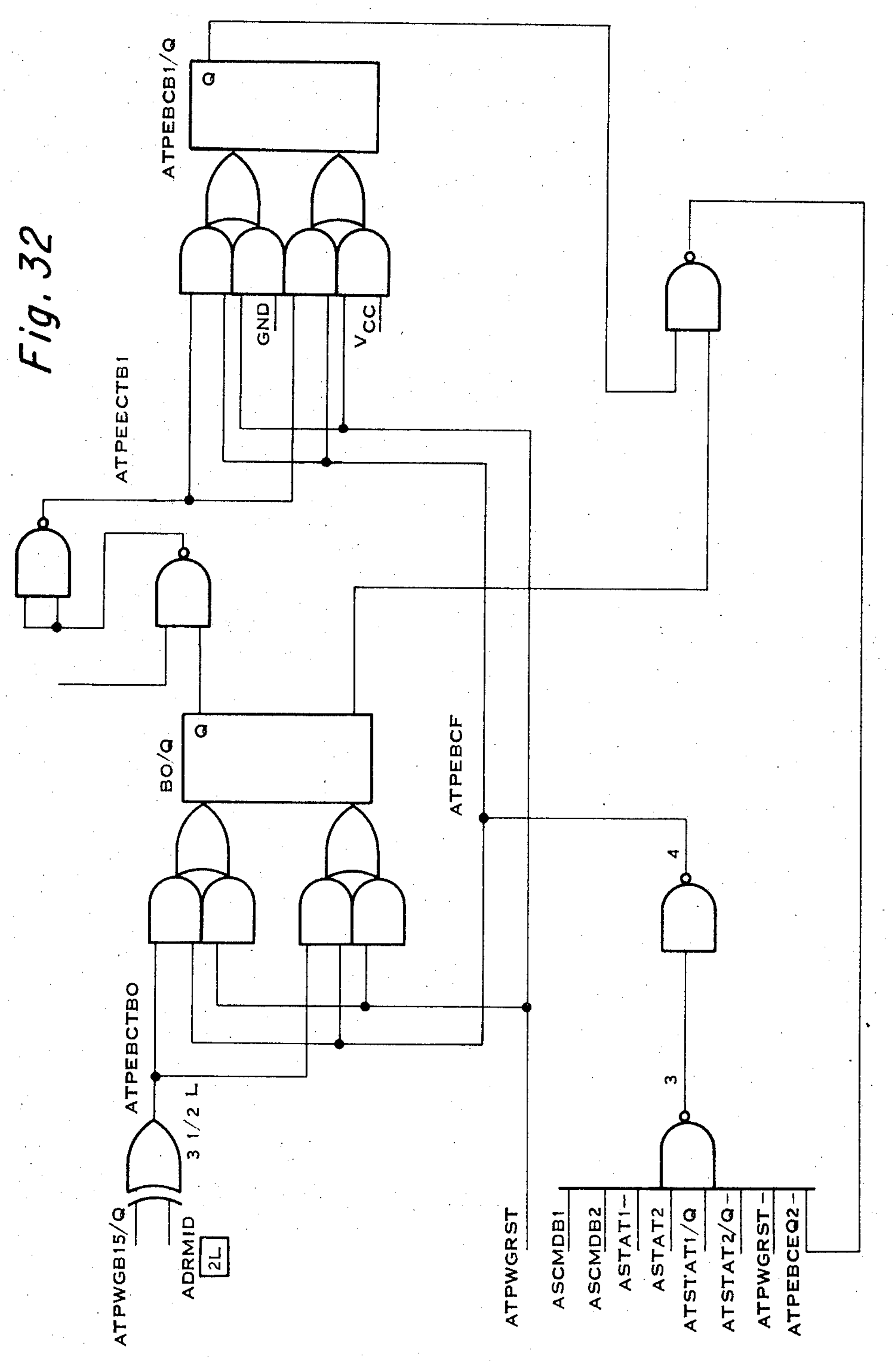

FIG. 32 shows the parity word bit counter.

Figure 33:
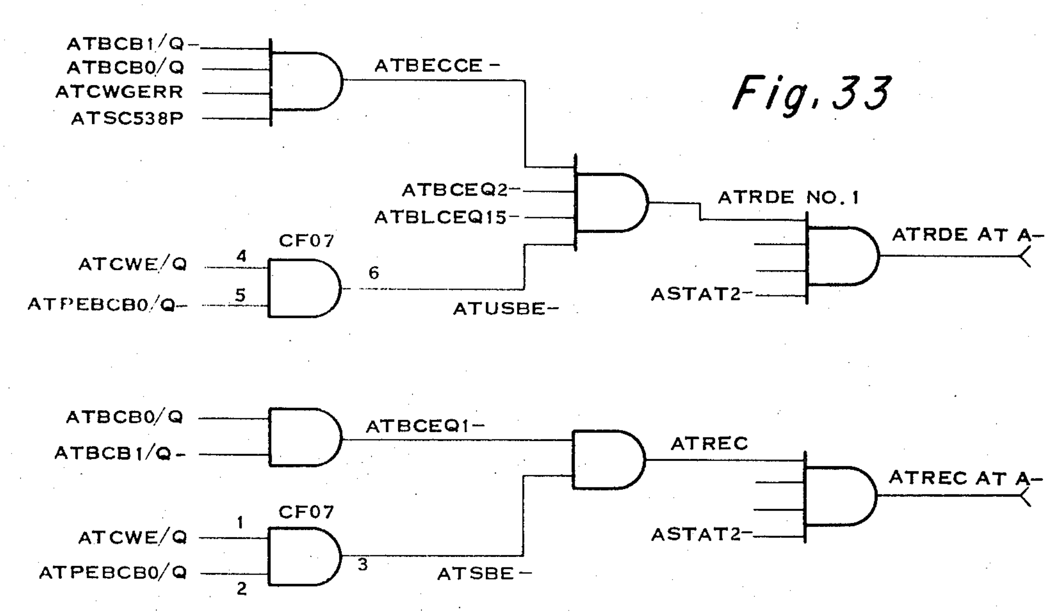

FIG. 33 shows the error status logic.

In the magnetic disc described herein, each segment of data on a track consists of 512 binary bits. This unformatted 512 bit data stream is referred to as Read or Write Data. Associated with each segment of 512 data bits is a 16 bit parity word and associated with the total of the 512 bit data words and the 16 bit parity word is a 10 bit check word. The 538 bit formulated serial bit stream is referred to as a Read or Write Message. In the 16 bit parity word there is 1 parity bit for each modulo 16 in the 512 bit data word. The check word parity check is a parity check code on the modulo-2 sum of the data bits and the 16 parity bits. In a check word, the parity bits consist of all possible different parity checks on the information bits. The specific 10 bit check word checks the parity of the data bit plus the parity bits up to decimal number 512 instead of 1,024. Therefore, there is not a complete check of all the different parities on the information and parity bits.

Figure 1:
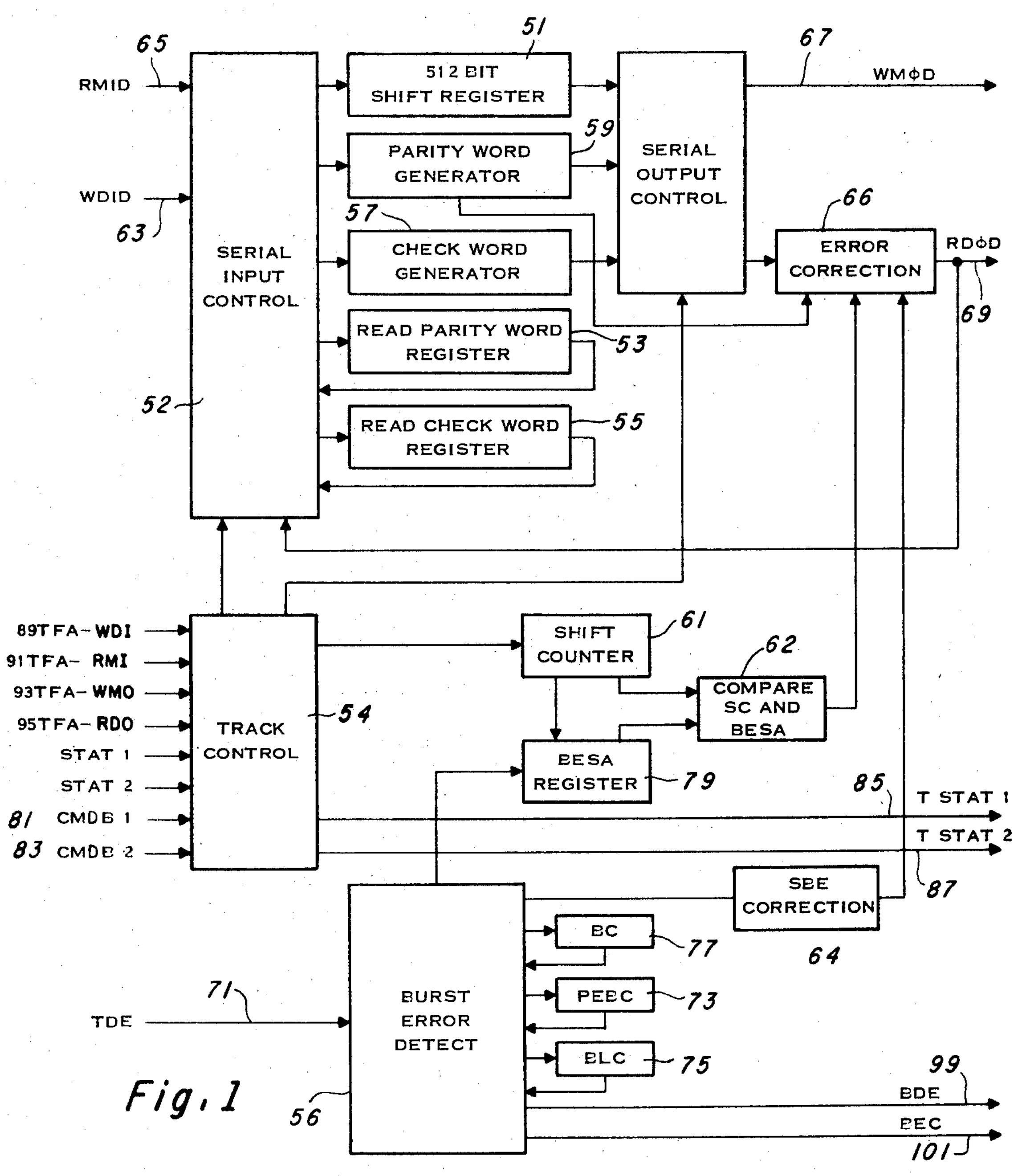

Referring now to FIG. 1, for a general description of the system:

There is one track buffer and processor for one track of serial data on the disc. All data transfers and manipulations or processing is serial. There is a 512 bit shift register 51 for temporary storage of data. A 16 bit read parity word register 53 saves intact the parity word read from the disc. The read check word register 55 saves intact the check word read from the disc. The 10 bit check word generator 57 functions in three modes of operation: as an encoder, a decoder and an error syndrome multiplier. The check word generator 57 decodes the data message during a read operation and multiplies the error syndrome to develop an error locator value during read dumping. The parity word generator 59 develops a 16 bit parity word for write messages. It operates on the read message to produce a parity error word. This parity error word is used for burst error correction. A 10 bit shift counter 61 is the core of the state control logic. The shift count in the shift counter 61 is also used as a starting address for burst error correction.

The track buffer shown in FIG. 1 is essentially a four part buffer with two inputs and two outputs. The write data input data (WDID) on input terminal 63 and the read message input data (RMID) on input terminal 65 are the two serial input signals to the Serial Input Control 52. The write message output data (WMOD) on output terminal 67 and the read data output data (RDOD) on output terminal 69 are the two serial outputs. The unformulated 512 bit data streams are referred to as read or write data depending upon whether they are being read from the disc or being read to the disc. The 538 bit formulated serial bit stream consisting of the 512 bit information, the 16 bit parity and the 10 bit check word is referred to as a read or write message.

When the track buffer is reading a message from the disc a track data error input on input terminal 71 to burst error detection 56 is used in a manner to be described to locate burst errors. The parity error bit counter 73, the burst length counter 75, the burst counter 77, and the burst error starting address register 79 are part of the burst error detection logic. The compare shift counter and BESA 62, the single bit ERROR correction 64 and ERROR CORRECTION 66 form part of the error correction logic.

The mode of the operation of the track buffer and processor is controlled by the sector command bits inputted on terminals 81 and 83, respectively, to track control 54. Track buffer status signals are developed from decoded shift counts and are indicated on output terminals 85 and 87.

Four transfer acknowledge signals start and stop the shift counter for each buffer. These signals are as follows:

Terminal 89 TFA-WDI Write data input
Terminal 91 TFA-RMI Read message input
Terminal 93 TFA-WMO Write message output
Terminal 95 TFA-RDO Read data output The track buffer and processor shown in FIG. 1 are used for four different modes of operation. The first mode of operation is read filling, where the message on the disc itself is read from the disc and stored in the shift register 51. In the second mode of read dumping, the data is read from the shift register 51 and delivered to the computer on the read dumping output data terminal 69. In the third mode of write filling, the data is taken from the computer on the write data input data terminal 63 and stored in the shift register 51. In the fourth mode of write dumping, the data is taken from the shift register 51 and delivered on the write mode output data terminal 67 to the disc to be stored thereon.

The term data, when used in this description, refers to the 512 bits of data and refers to the data received from the computer to be stored in the shift register 51. The term message refers to the message stored on the disc which includes the 512 bits of data, the 16 bit parity word, and the 10 bit check word.

WRITE FILLING

The operation of the track buffer processor shown in FIG. 1 will be described starting with a write filling operation. During this operation, there will be the writing of data from the computer into the shift register 51. A write command will be applied to the CMDB1 and CMDB2 terminals 81 and 83 respectively to condition the track control 54 for a write message. The signals applied to the STAT1 and STAT2 terminals tell the track control, to look for a write data in (WDI) Control Signal 89 telling the track buffer processor to commence a write data in operation.

Shift register 51 is enabled so that data received on the write data input data terminal 63 will be shifted into shift register 51. The parity word generator 59 is enabled in the encoding mode for encoding a parity word in a modulo 16 parity. The check word generator 57 is enabled in the encoding mode for encoding a check word in the modulo 2 parity. After the 512 bits have been shifted into the shift register 51, there has been a corresponding parity word generated in the parity word generator 59. The shift register 51 is full, and then the check word generator 57 generates a 10-bit check word with modulo-two arithmetic for the 512 bits of data and the 16-bit parity word.

The inputs to the STAT1 and the STAT2 terminals indicate that the data has been transferred and the WDI input ceases. The write filling has been an operation in writing the data from the computer into the buffer shift register 51. There was no parity word nor check word associated with the 512 bits of data at the time it was transferred from the computer into the shift register. A parity word is generated in the parity word generator 59 and a check word generated in the check word generator 57 during the transfer. There has thus been assembled in the track buffer a message consisting of the 512 bits of data plus the 16 bit parity word plus a 10 bit check word.

WRITE DUMPING

The next operation described is a write dumping operation. The commands to the track control 54 indicate that a write mode operation is to be performed with an input control applied to the WMO terminal 93. The message in the track buffer consisting of the 512 bit data words plus the 16 bit parity word plus the 10 bit check word is shifted out on the write message output data terminal 67 to the disc and stored on the disc.

After all of the message has been shifted out of the track buffer, all registers are reset.

READ FILLING OPERATION

The read command is applied to terminals 81 and 83 to enable the track buffer. The read message control signal initiates the read filling operation. During the subsequent read filling operation, data is received on the read message input data terminal 65 during normal operation and shifted into the 512 bit shift register 51. As the data is shifted into the shift register 51 a parity word is generated in the parity word generator 59 for the data shifted in. The parity word associated with the 512 bits of data stored on the disc is then received and shifted into and Exclusive OR'd bit for bit with the generated parity word already in the parity word generator 59. If the two parity words are equal to each other, then the contents of the parity word generator 59 will become zero. The associated parity word from the disc is stored in the read parity word register 53.

In a similar manner, the data plus the parity word and check word read from the disc is shifted into the check word generator 57 to generate a value. The check word generator 57 is zeroed out if the 512 data bits plus the parity word are received properly.

The check word received from the disc is also stored in the read check word register 55.

READ DUMPING

When there is a perfect and complete data transmission, then there is a simple dumpout of the 512 bits of data on the read dump output data terminal 69 to the computer.

BURST ERROR DETECTION AND CORRECTION

When a bad signal from the disc is demodulated, a signal is applied over the track data error input terminal 71 to the burst error detection circuitry 56. A demodulator which may be used in disclosed in copending application Ser. No. 59,890 filed July 31, 1971, for a Frequency Modulation Demodulator. The shift counter 61 keeps track of how many bits of data are being shifted into the shift register 51. At the time a track data error signal is received on input terminal 71, burst counter 77 is incremented to one.

The burst counter 77 is incremented to one to indicate that one burst error has been detected. The burst length counter 75 is started and is incremented with the shifting of subsequent bits into the shift register 51 until a count of 15 is reached the 16th bit after the detection of an error. The parity error bit counter 73 is inactive at this time.

The shift counter 61 has been counting since the first bit of data was shifted into the shift register 51. The shift counter 61 is capable of counting to 538. At the time of the track data error signal on the track data error input 71, the contents of the shift counter 61 are transferred to the burst error starting address register 79. The contents of the shift counter 61 which are transferred to the burst error start address register 79 indicate the address in the shift register 51 of the first bit of data in the burst error as indicated by the track data error signal on input terminal 71. The normal filling operation continues with the data being shifted into the shift register 51.

When the shift register is full with all 512 bits of data shifted into shift register 51, then the burst counter is looked at to see if it is primed to a "one," indicating that one burst error has been detected. If the burst counter is primed to "one," then the single burst error can be corrected. If the burst counter is incremented to "two" or more, this is an indication that two or more burst errors have been detected and this cannot be corrected. If there is more than one burst error, so that it cannot be corrected, then the data in the shift register 51 is dumped unchanged and a signal is produced on the read data error output terminal 99 along with the dumping of the data to indicate that this is bad data which is being dumped.

If the data can be corrected with only one burst error, then the track buffer proceeds to correct the error in the manner to be described.

The shift counter 61 is zeroed. The location in the shift register 51 of the start of the burst error is stored in the burst error start address register 79 as described previously. The data is then shifted out one bit at a time and as the data is shifted out, the shift counter 61 counts. As the data is shifted out and the shift counter 61 counts, the count in the shift counter 61 is compared with the address in the burst error starting address register 79 to locate the first bit of data in the shift register 51 which is in the burst error.

The contents of the check word generator 57 have been cleared since there was a burst error and the contents of the check word generator 57 will be of no use in correcting the error. The parity word generator contents remain in the parity word generator to assist in correcting the error in the message in a manner that will be described. Assuming an error in the data, there will be a parity error indication in the parity word generator 59. As the data is shifted out of the shift register 51, the contents of the parity word generator are circulated in synchronism with this shift-out of the data. The output from the shift register 51 is scanned by the error correction logic 66. The burst length counter 75 has counted to 15; the burst counter 1 has been set to "one"; and a flag is set on the burst error correction output terminal 101 to indicate that there will be a burst error correction. Thus, as the data is shifted out of the shift register 51, when there is a match between the contents of the shift counter 61 and the burst error start address register 79 there is a start of the burst error in the data in the shift register 51. The output bits of the shift register 51 and the parity word generator 59 are Exclusive OR'd together to complement the data bit and correct it. This is because if there was an error in that data bit, there is a "one" in the corresponding parity word bit indicating a bad data bit. Thus, Exclusive ORing the "one" in the parity word bit with the bad data bit will complement the data bit and correct it. If there was a track data error indicated and in actuality there was no bad data bit, then the parity bit corresponding to that good data bit is zero and thus the Exclusive ORing of the data bit with the parity word bit does not change the data bit and the good data bit remains good. This is carried out for 16 bits to correct the bad data bits in the shift register 51. The burst length counter 75 is decremented for each data bit shifted out of the shift register 51. When the burst length counter 75 is decremented to zero, then error correction stops.

After the error has been corrected in a burst error in the manner described, there is a post error correction check. This check is to insure that the error has been corrected. The 512 bits of data are taken from the read dump output data terminal 69 and fed back through the check word generator 57 in the decode mode. Then the parity word from the read parity word register 53 which is the original parity word stored with the data on the disc and the original check word stored in the read check word register 55 are fed through the check word generator 57 to check and make sure that the burst errors are corrected. If there are no other errors indicated from reading the complete message consisting of the data, the parity word and the check word, then the burst errors have been successfully corrected as the check word generator zeroes itself out with no error syndrome remaining therein after the check. If the error has not been corrected, then the read data error flag on output terminal 99 is set and when the data is dumped out there is an indication that we have corrected the burst error but there is still an error in the data.

SINGLE BIT ERROR - DETECTION AND CORRECTION

Assume there is no track data error, but when the read filling is complete the check word generator 57 has a nonzero value or an error syndrome, as it may be termed. The parity word generator 59 has a parity bit set to one. The parity error bit counter 73 is enabled during the final 16 bits as the parity word is being generated in the parity word generator 59. The parity error bit count 73 indicates the number of parity errors that have been detected during the read filling operation. If there is a single bit error, there is an error syndrome in the check word generator and the parity error bit counter 73 has a count of one. This indicates that there is a single bit error which is correctable. If the parity error bit counter 73 is set to zero, two or more, this indicates that there are multiple errors and this is uncorrectable. If there are multiple errors, and it is uncorrectable, then the read data error flag on output terminal 99 is raised indicating that the errors are uncorrectable and the data is dumped. This assumes that there has been no track data error.

If there is a single count in the parity error bit counter 73, this is an indication that there is a single error and it is correctable. If there is a single error which is correctable, then the correction may start. The correction will start with a read dumping operation as the data is shifted out of the shift register 51. The check word generator 57 goes into a multiply mode. In a multiply mode, the check word generator 57 shifts the contents of the check word generator as the data is shifted out of the shift register 51 until the error locator value in the check word generator indicates that the data bit being shifted out of the shift register 51 is the bit to be corrected. At that point in time, the data bit being shifted out is complemented and corrected. In this manner, a single error bit in the shift register 51 is corrected.

BURST ERROR AND SINGLE BIT CORRECTION AND DETECTION

There is no way to detect both a burst error and a single bit error at the beginning of a dumping operation. The indications of a burst error obscure the single bit error. The burst error is detected and corrected as described previously in this description. After the burst error is detected and corrected, then the data with the corrected burst error is checked to determine if there is a single error in the message. If there is a single bit error after the burst error correction, then the single bit error detection circuitry is used as described to indicate the single bit error.

Table I shows the signals used in the following description and accompanying drawings.

Figure 3:
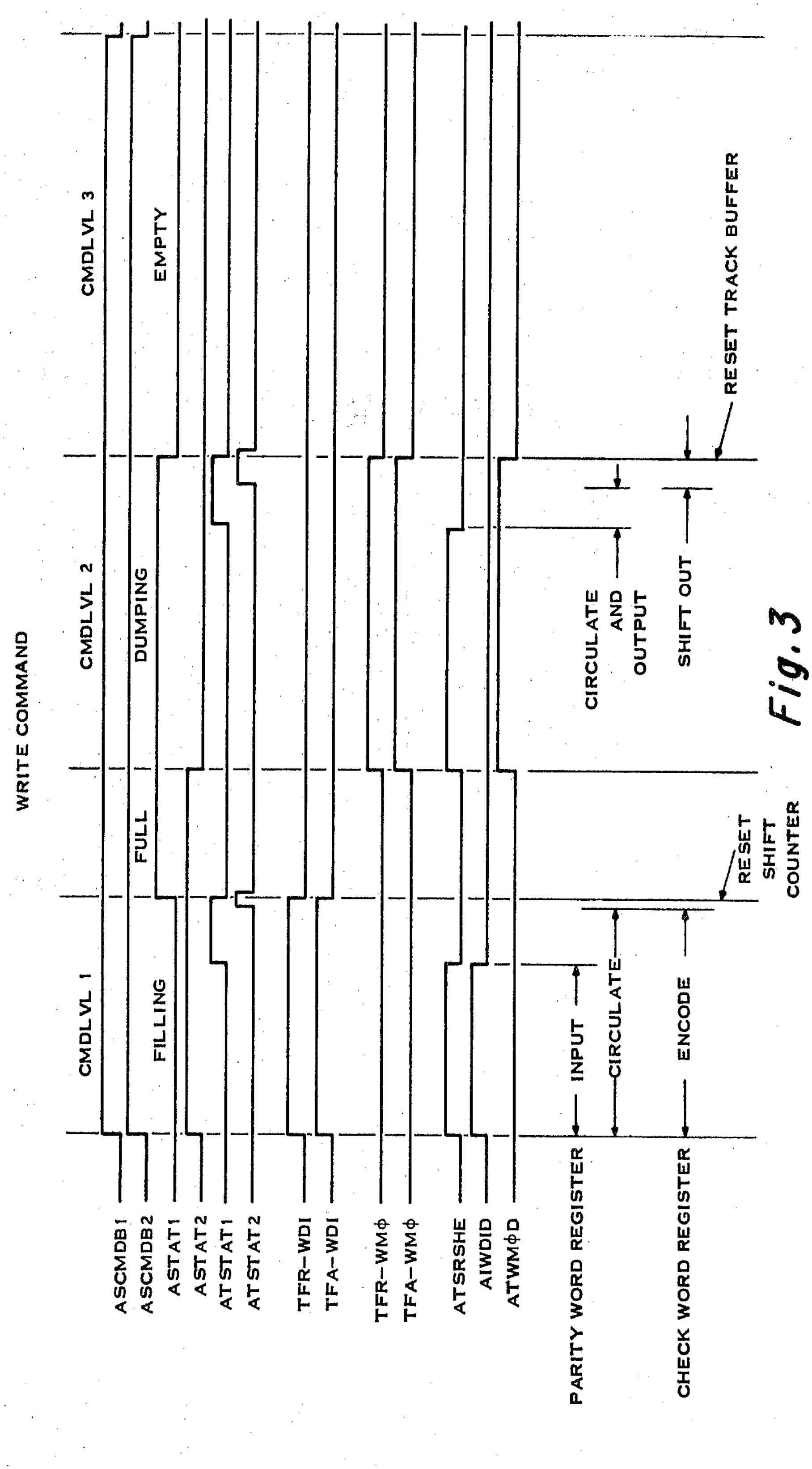
FIGS. 3 and 4 are timing charts for the read commands and write commands.
Figure 4:
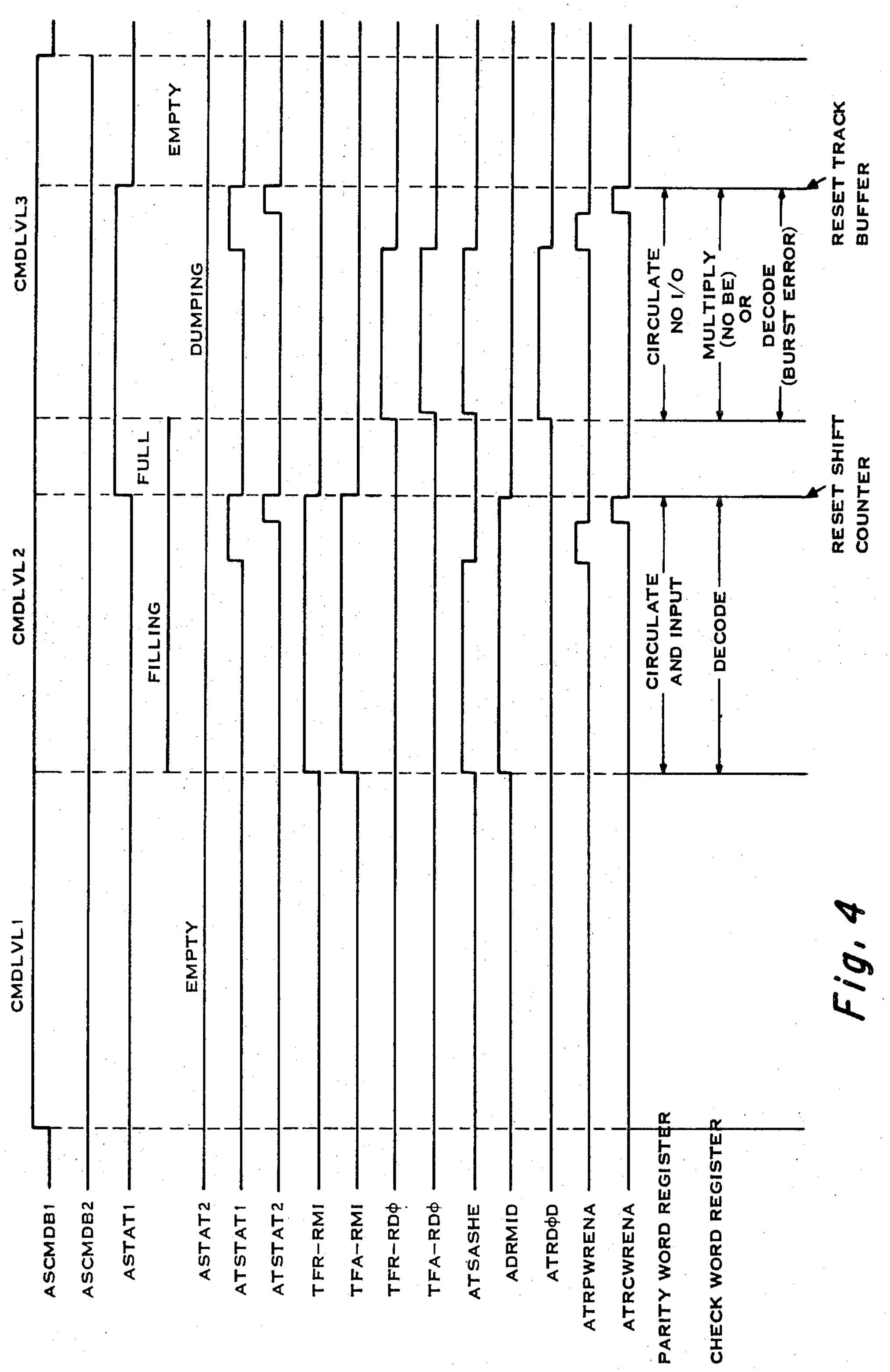

FIG. 3 shows the timing for the various input-outputs for the write command. FIG. 4 shows the inputs and their timing for the read command.

Figure 5:
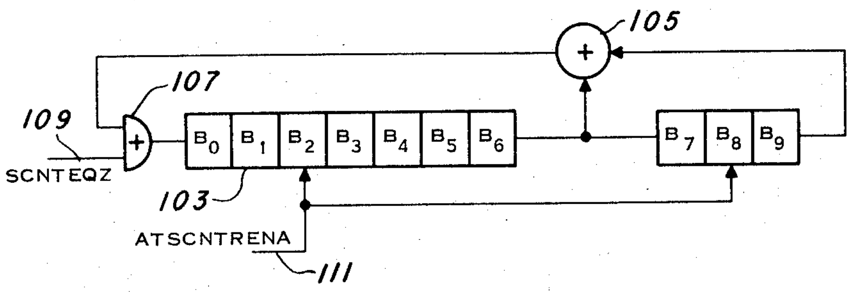
FIG. 5 shows the track buffer shift counter.

Referring now to FIG. 5 which shows the track buffer shift counter, the track buffer shift counter is a 10 bit linear shift register with a modulo-2 feedback. The counter is shown with 10 bits $B_0$–$B_9$. There is a feedback through an Exclusive OR circuit 105 from the $B_6$ and $B_9$ bits back to AND circuit 107.

The track buffer shift counter shown in FIG. 5 is the shift counter 61 shown in FIG. 1.

The shift counter is a non-maximal length counter which reports initial counts.

Figure 6:
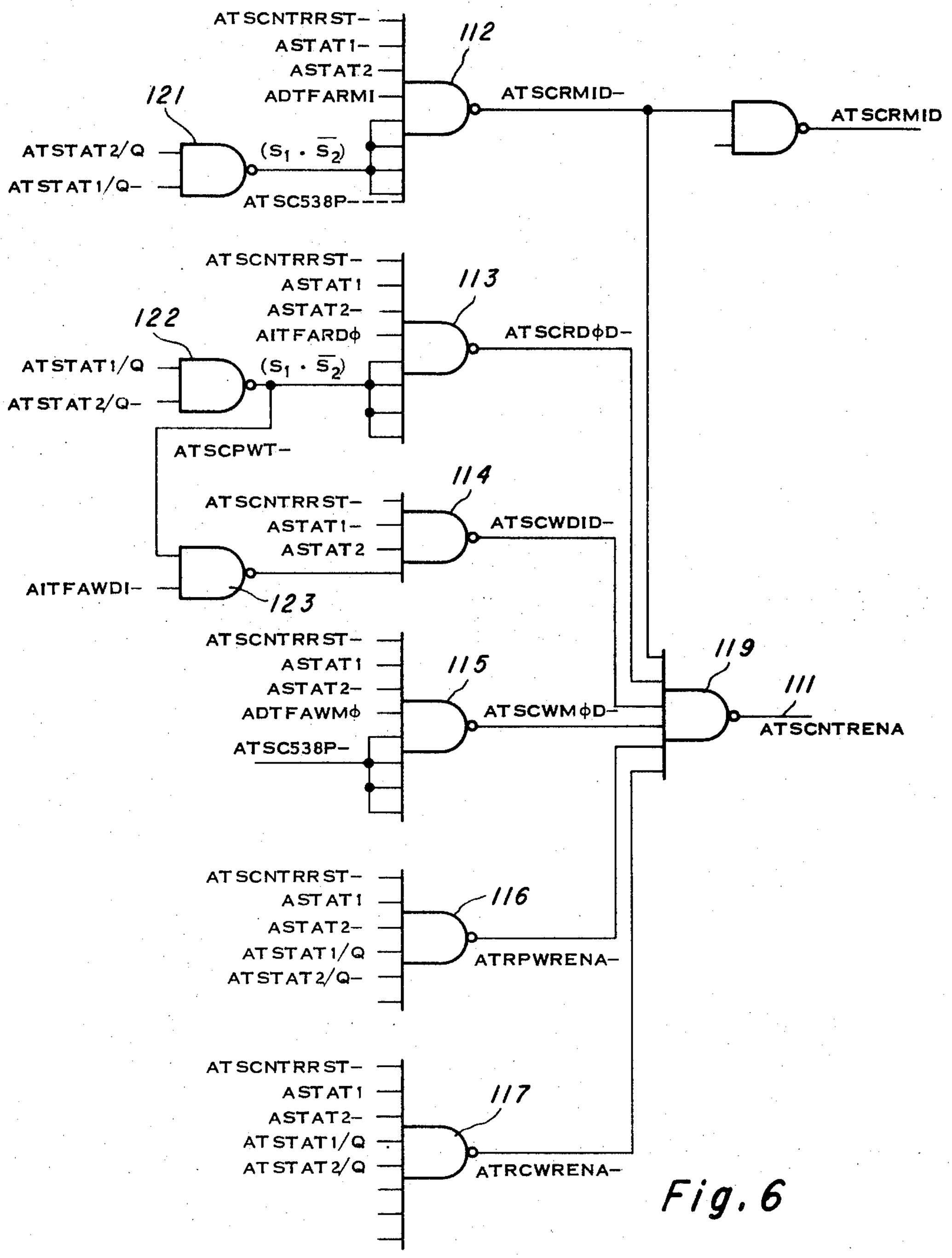
FIG. 6 shows the shift counter enable circuitry.

The shift counter is cleared to the all zero state when the track buffer is reset. The normal feedback term is false but the SCNTEQZ input on input terminal 109 is true allowing the first bit $B_0$ of the shift counter to be set when the shift counter is enabled by applying a "1" signal to the SCNTRENA input terminal 111. The count in the shift counter progresses in a normal manner from this point until the shift count = 537 and at the next clock pulse SCNTRENA shows false when the counter is disabled. The shift counter 103 is always started from the cleared state. The intervening shift counts of 511 and 527 are decoded to control the status cells TSTAT1/Q and TSTAT2/Q. The SCNTRENA signal applied to terminal 111 of the shift counter in FIG. 5 is controlled by six terms as shown in FIG. 6.

The abbreviation for the terms and their description with reference to the terminal numbers and figure numbers are all shown in Table I.

The SCNTRENA signal is controlled by the following six terms applied from NAND circuits 112–117. The outputs from these NAND circuits are applied to NAND circuit 119 so that when signals are applied from NAND circuits 112–117 NAND circuit 119 produces the aiding SCNTRENA signal on output terminal 111 to the shift counter in FIG. 5. There is a SCNTRENA signal when there are the following signals:

SCNTRENA = SCRMID + SCRD0D
+SCWDID + SCWM0D
+RPWRENA + RCWRENA

-SCRMID is true for shift counts 0 → 537 during read filling.

-SCRD0D is true for shift counts 0 → 511 during read dumping.

-RPWRENA is true for shift counts 512 → 527 during read filling and dumping.

-RCWRENA is true for shift counts 528 → 537 during read filling and dumping.

-SCWDID is true for shift counts 0 → 527 during write filling.

-SCWM0D is true for shift counts 0 → 537 during write dumping.

The NAND circuits 112–117 produce signals when signals are applied to them and to NAND circuits 121–123 in FIG. 6. The signals applied are shown in FIG. 6 and the corresponding description of those signals is shown in Table I.

Figure 7:
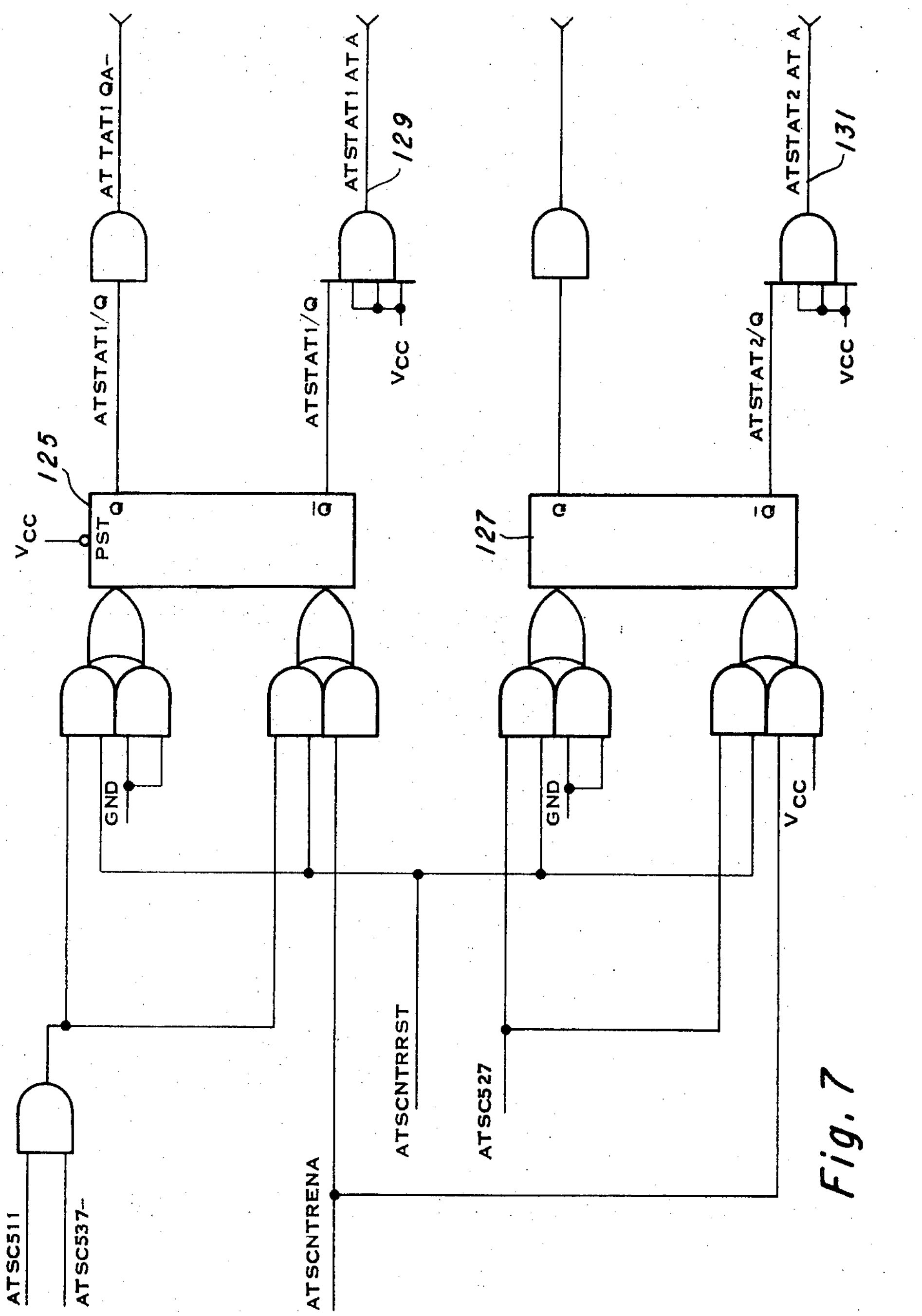
FIG. 7 shows the shift counter status cells.

The two shift counter status cells TSTAT1/Q and TSTAT2/Q are shown in FIG. 7. These status cells are cleared at the end of each filling or dumping cycle. The two status cells 125 and 127 are controlled by the SCNTRENA, SC511, SC527 and SC537 input signals shown in Table I. They are applied as shown in FIG. 7 to set and reset the status cells 125 and 127. When set to FALSE, the first status cell 127 produces an output on output terminal 129 which indicates the status of that cell and the second status cell 127 which when set to FALSE applies an output signal on output terminal 131 as shown. The STAT1/Q cell 125 is set from FALSE to TRUE at the SC511 time and reset back to FALSE at the SC537 time. The second status cell 127 is set to TRUE at the SC527 time and reset after the shift counter is cleared.

DATA SHIFT REGISTER

The 512 bit data shift register 51 shown in FIG. 1 is composed of four flip-flop input cells, 63 8-bit shift registers, and 4 flip-flop output cells. The entire 512 bits of storage in the shift register 51 are enabled by the shift register shift enable (SRSCHE) signal. This signal is developed from the four TFA control inputs and track status during the time wherein the shift count ranges from zero to 511.

Figures 8, 9:
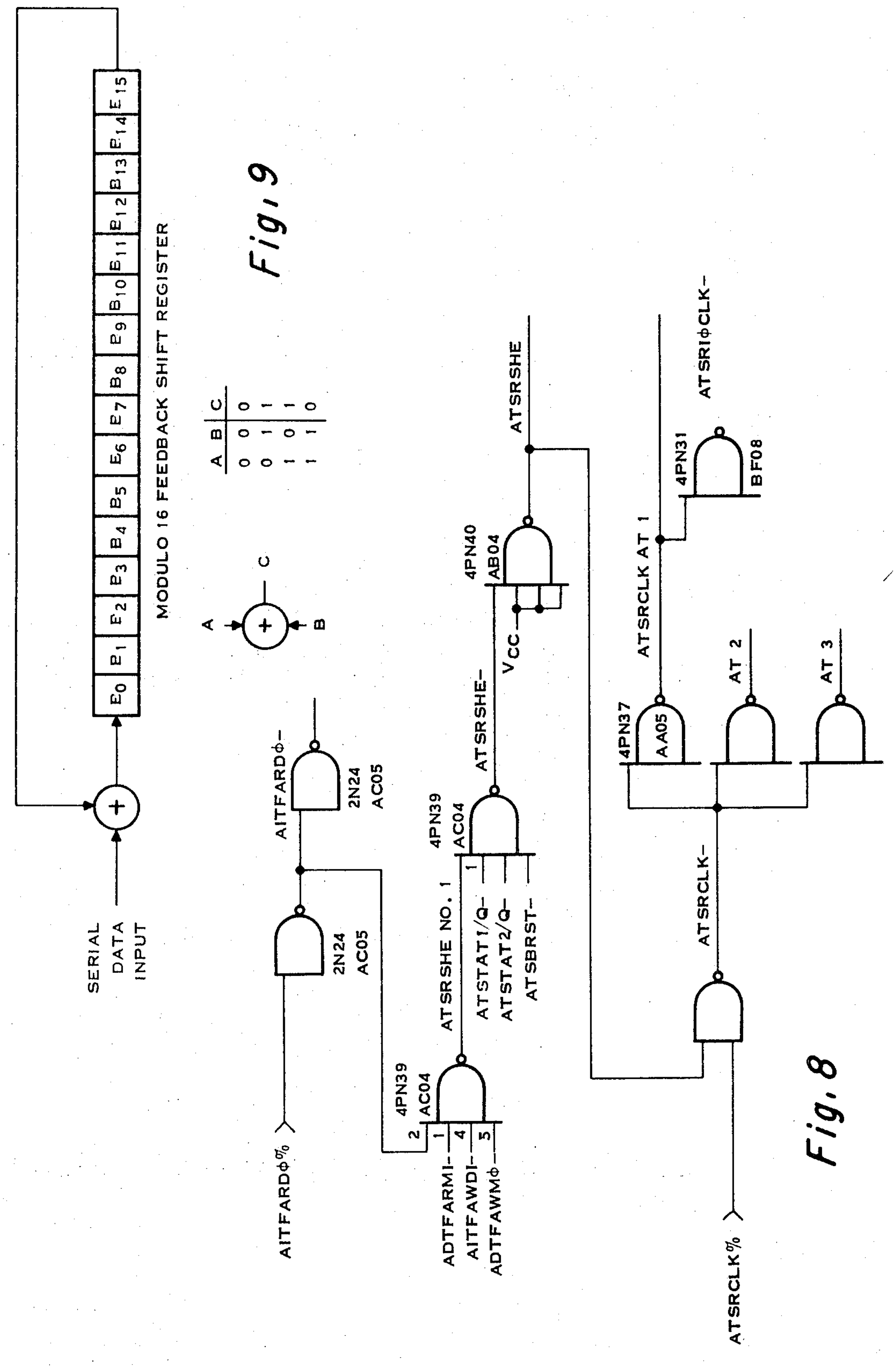
FIG. 8 shows the logic developing the shift register shift enable signal.
FIG. 9 shows the parity word generator.

Referring now to FIG. 8, the development of the shift register shift enable signal (SRSCHE) is shown. This signal is developed from the four TFA control inputs and track status during the time that the shift count is between 0–511. Thus, the SRSCHE signal = (TFARMI + TFARDO + TFAWDI + TFAWMO) (TSTAT1/Q – TSTAT2/Q). The signals are applied as shown in FIG. 8.

The shift register clock signal SRCLK is controlled by the SRSCHE signal and the control of this register clock is also shown in FIG. 8. The clocks of the eight I/O flip-flops, SRIOCLK = SCRCLK at 1-.

Figure 10:
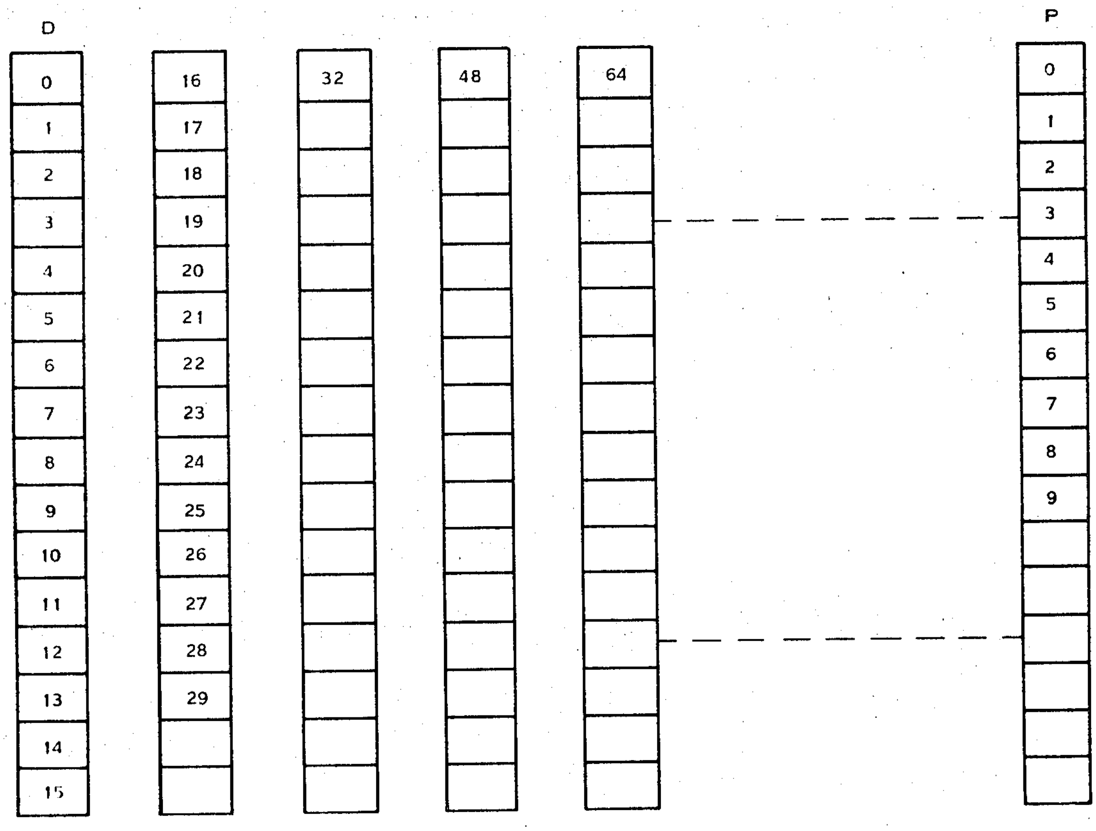
FIG. 10 shows the parity word relationship with the 512 bit data word.

The parity word generator (PWG) is a 16-bit shift register as shown in FIG. 9 with feedback from bit 15 of the shift register to the input. There is a serial data input to the shift register. Bit 0 is controlled by the Exclusive OR of bit 15 and the input data. This gives a modulo 16-bit parity word over 512 bits of data. The modulo-2 addition of bit zero, bit 16 and so on through bit 496 of the data word produces bit zero in the parity word. Even parity is generated with this algorithm. The parity bit relationship of the parity word with the 512-bit data word is shown in FIG. 10.

Figure 11:
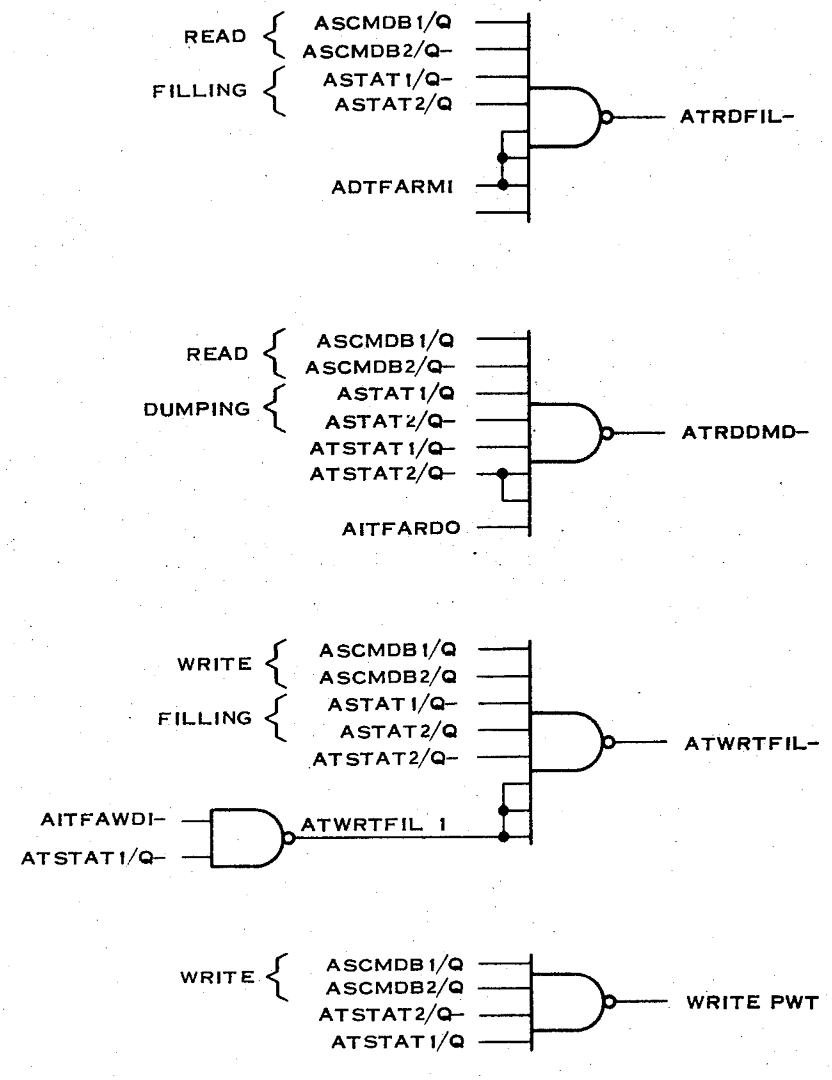
FIG. 11 shows the terms controlling the parity word generator.

Four terms control the parity word generator as shown in FIG. 11. The inputs to the parity word generator control are shown in FIG. 11 and the output on the output terminal is applied to the parity word generator. The following four terms are also generated as follows:

RDFIL = Read CMD · Dumping · TFARMI · (SCO →SC527)

RDDMP = Read CMD · Dumping · TFARDO · (SCO →511).

WRTFIL = Write CMD · Filling · (TSTAT2/Q-) · (TFAWDI + TSTAT1/Q).

PWGC1 No. 1 = Write · Parity Word Time

Parity word generator shifting is enabled by any of these terms shown above and no parity word generator reset as shown in FIG. 12. The parity word generator shift enable signal (PWGENA) signal is produced from the following equations:

PWGENA = (RDFIL + RDDMP + WRTFIL + PWGC1 No. 1) (PWGRST) -

The serial data input signal (SDIN) to the parity word generator is from either the RMID or WDID signals as shown in FIG. 12*a* and as shown by the following equation:

SDIN = SDIN No. 1 + SDIN No. 2 and

SDIN No. 1 = RMID · RDFIL

SDIN No. 2 = WDID · Write CMD · Filling · (SCO → 511) · (TFAWDI)

The parity word generator word output (PWGOUT) is enabled during write parity word dumping time as shown in FIG. 12*c* and according to the following equation:

PWG0UT = PWGB15/Q · PWGC1 No. 1 · (WRTFIL-)

When PWGENA is true and SDIN is false, the contents of the parity word generator will circulate unchanged.

The parity word generator enable signal PWGENA is shown in FIG. 12*b*.

CHECK WORD GENERATOR

Figure 13A:
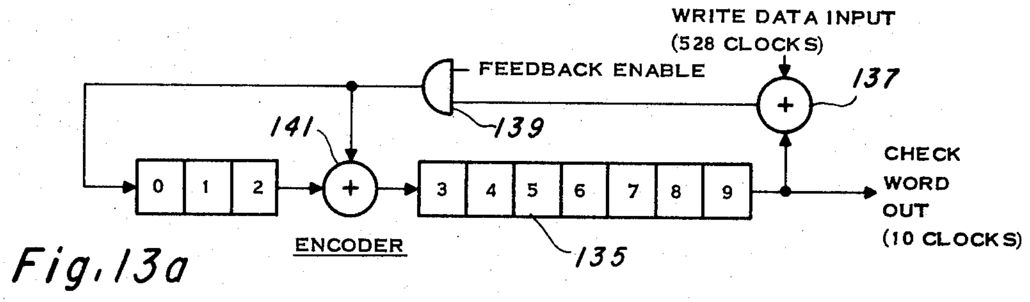
Figure 13B:
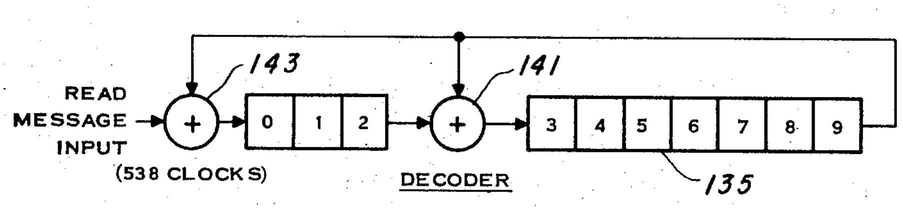
Figure 13C:
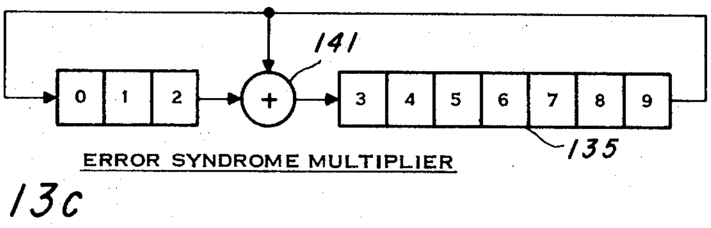
Figure 13D:
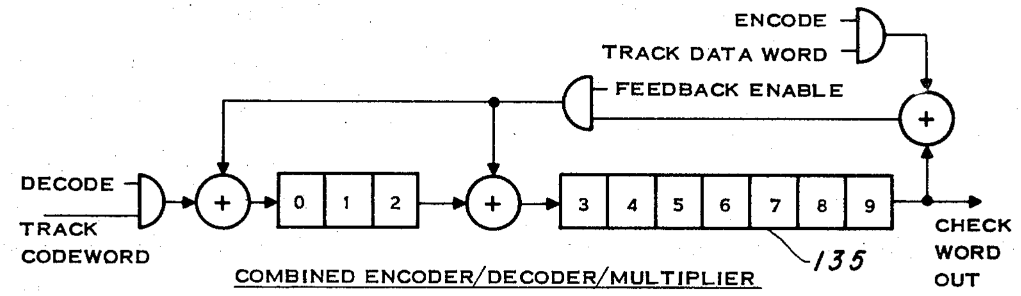

The check word generator 57 in FIG. 1 is a 10-bit linear sequential shift register with feedback shown in more detail in FIGS. 13*a*–13*d*. The check word generator as shown in FIGS. 13*a* –13*b* is a combined encoder/decoder and multiplier.

As an encoder, the check word generator 135 has serial information Exclusive OR'd at Exclusive OR circuit 137 with the output from bit 9 of the check word generator 135 to produce the feedback term which is enabled in Exclusive OR circuit 139 and applied to the first bit of the check word generator 135 and Exclusive OR'd at the Exclusive OR circuit 141 with the output of bit 2.

FB = CWGB9/Q + Input Data

The state of bit 0 is determined by FB alone. Bit 3, however, is controlled by bit 2 and FB.

$CWGB3/Q_{n+1} = CWGB2/Q_n + FB_n$

During write filling, the check word generator acts as an encoder producing a linear systematic Hamming check word. This check word is appended to the 528 bit data and parity word to produce a write data message.

During read filling, the check word generator acts as a decoder as shown in FIG. 13*b*. In this mode, $CWGB0/Q_{n+1} = RMID_n \oplus CWGB9/Q_n$ and $CWGB3/Q_{n+1} = CWGB9/Q_n \oplus CWGB2/Q_n$ The ninth bit is Exclusive OR'd at Exclusive OR circuit 141 with the output from bit 2 and the feedback from bit 9 is also Exclusive OR'd at Exclusive OR 143 with the read message input signal.

The check word generator has all 538 bits of the read message shifted in during read filling. If no errors have occurred during the write-read cycle, then the contents of the check word generator will be zero. The remainder in the check word generator at this time is known as as error syndrome. As stated, an error syndrome of zero indicates that there has been perfect data transmission. Should there be a single error, then the error syndrome will have a nonzero value directly related to the bit position in the message of the erroneous bit. To correct this bit, the error syndrome is multiplied (shifted) in step with the read dump output data serial bit stream. When the erroneous bit is at the output of the shift register, the check word generator will contain the error locator value. Consequently, a decode of the error locator value is used to complement the output data bit, thus correcting the single bit error. The actual logic is implemented with a 1 bit look-ahead necessitated by logic level considerations.

In the case of a burst error, the check word generator is cleared at the end of read filling. The error syndrome at this time is not valid due to multiple errors. As the burst corrected read data is shifted out during read dumping, it is also input to the check word generator which is operating in the decode mode at this time. After the 512 data bits, the contents of the read parity word register and then the read check word register are inputted. An unsuccessful error correction will be indicated by a nonzero error syndrome.

In the error syndrome multiplier, the output from bit 9 of the check word generator is Exclusive OR'd at Exclusive OR 141 with the output of bit 2 and the feedback from bit 9 is applied directly to the zero bit of the check word generator.

The combined encoder/decoder/multiplier is shown in FIG. 13*b*.

FIG. 14 shows the check word generator control and more specifically, the shift enable terms which are developed from five terms:

RDDMP }
WRTFIL } Refer to PWG Control
CWGC1 No. 2 CWG Control 1 No. 2
CWGC3 No. 1 CWG Control 3 No. 1

CWGC1 No. 2 = Read · Filling · TFARMI · (SC538)-

CWGC3 No. 1 = Write · Dumping · TFAWMD · Checkword Time

The complete equation is:

CWGENA = CWGRST – (CWGC1 No. 2 + CWGC3 No. 2 + RDDMP + WRTFIL)

The simplified equation for the feedback term is as follows:

CWGFB = (CWGB9/Q ⊕ Input Data)

Feedback need only be inhibited during the time when the check word is being shifted out and written on the disc. Thus feedback control = CWGC3 No. 1-.

FIG. 16 shows the generation of the feedback term. The input data is write filling parity (WFP) and write filling data (WFD).

Then

CWGFB = [CWGB9/Q ⊕ (WFP + WFD)] CWGC3 No. 1-expanding '⊕'

= [CWGB9/Q– · (WFP + WFD) + CWGB9/Q · (WFP + WFD)–]

CWGC3 No. 1-

This function may be met according to the following truth table:

WFP

CWGB9 Q; CWGC3 #1

| | | | |
|---|---|---|---|
| 1 | 0 | 0 | 0 |
| 0 | 0 | 0 | 0 |
| 0 | 0 | 0 | 0 |
| 0 | 1 | 1 | 1 |

WFD

The Exclusive OR at the input to CWGB0 and CWGB3 is implemented with two AND/OR inverters.

The inputs to the zero bit of the check word generator register are developed in a like manner.

The input to the check word generator in the decode mode is code word in (CWIN). The generation of code word in is composed of four terms.

$$CWGB3/J=\overline{(CWGB2/Q \cdot CWGFB+CWGB2/Q-\cdot CWGFB-)}$$

$\overline{CWGB3/J}$ $B2/Q\{$ (columns $FB$, $\overline{FB}$)

| | |
|---|---|
| 1 | 0 |
| 0 | 1 |

Complementing: $B2/Q\{$ (columns $FB$, $\overline{FB}$)

| | |
|---|---|
| 0 | 1 |
| 1 | 0 |

Thus $CWGB3/J=CWGB2/Q \oplus CWGFB$

Similarly $$\overline{CWGB3/K}=(CWGB2/Q \cdot CWGFB-+CWGB2/Q-\cdot CWGFB)$$

which reduces to $$CWGB3/K=\overline{CWGB2/Q \oplus CWGFB}$$

$\rightarrow$

CWGRMIN - CWG Read Message Input

BECRD0D - Burst Error Corrected - Read Data Output Data

BECRPW - Burst Error Correction - Read Parity Word

BECRCW - Burst Error Correction Read Check Word

CWGRMIN = CWGRMIN + BECRD0D + BECRPW + BECRCW

These four terms are mutually exclusive.

CWGRMIN is the serial read message stream from the disc.

CWGRMIN = RMID · CWGC1 No. 1.

The burst error correction (BEC) signals are made available during the read dumping so that a post error-correction check can be made with the CWG.

BECRD0D = Dumping · SC(0 → 511) · RD0D

BECRPW = Dumping · RPWRENA · Read Parity Word Register Bit 15

BECRCW = Dumping · RCWRENA · Read Check Word Register Bit 9

FIG. 15 shows the combination of the feedback plus the write mode controlling the check word generator.

FIG. 18 shows the burst error correction logic. The burst error correction logic operates in two modes - detection mode and correction mode. In the detection mode, several bookkeeping tasks are performed when a Track Data Error (TDE) signal is present. The shift count in the 512-bit data shift register is saved in the Burst Error Starting Address Register 151, the Burst Length Counter 153 is started; and the Burst Counter 155 is incremented. A 3 bit look-ahead, with respect to the Track Data Error signal, is achieved by delaying RMID and the TFARMI with 2-bit shift registers located in the Sector Buffer. This look-ahead is required in order that the correction logic may start in advance of the actual track data error shift count. It is possible that a track data error condition may not be detected in the disc unit demodulator until after the actual error has occurred.

FIG. 19 shows the timing for the track data error detection.

The burst counter increment signal (BCINC) is generated in the burst error detection logic 157 in FIG. 18 as shown in more detail in FIG. 20. The burst counter increment signal (BCINC) is produced by the following equation and as shown in FIG. 23.

BCINC = TDE · TFARMI · BLC1T9- · BCEQ2-

The burst length count 1 to 9 shown in FIG. 18 on line 159 from the burst length counter 153 and applied to the burst error detection circuitry 157 is true for nine clocks after the burst counter increment signal (BLCINC) is true. Any track data error transition during this time is masked by the burst length count 1 to 9 (BLC1T9-).

The tuning chart in FIG. 19 shows that this burst length count 1 to 9 asks a track data error signal transition at this time.

When the burst count equals 2 (BCEQ2) an uncorrectable condition has occurred. Further track data error signals are inhibited from incrementing the burst counter by the burst count equals 2 signal (BCEQ2-). The burst counter is a 2-bit binary counter as shown in FIG. 21.

Burst length counter (BLT) shown as burst length counter 153 in FIG. 18 is a 4-bit up-down binary counter shown in more detail in FIG. 22. The burst length counter started at the beginning of a burst error by the burst error start address load signal (BESALD). The burst error start address load signal is shown in FIG. 20 and applied to the burst error start address register 151 while the burst length counter increment signal shown in FIG. 20 is applied to the burst length counter 153 and applied in FIG. 22 as shown.

The burst error start address load signal (BESALD) transfers the contents of the shift counter 159 in FIG. 18 to the burst error start address register 151.

Should a burst error occur during read filling, then the following conditions are established when the track is full.

BLC = 15

BC = 1 for single burst error or 2 maximum for multiple burst errors

BESA = Shift count at the time the TDE signal first goes true

PWG = Parity errors from the erroneous data - (Valid for single burst errors only)

CWG = Error syndrome for multiple single bit errors. This syndrome is not used for any error correction and is cleared at SC538P if there exists only one burst error (BC = 1)

When the track buffer starts dumping data, the contents of the burst error start address register 151 are continuously compared with the contents of the shift counter 159. One bit look-ahead is required for the burst error correction flip-flop (BECORR/Q). This is accomplished by comparing the burst error start address register cells to the J inputs of the corresponding cells of the shift counter 159 as shown in FIG. 23. The comparison circuitry for comparing bits of the shift counter 159 and the burst error start address register 151 is shown in FIG. 23. For example, the zero bit of the shift counter 159 (SCNTRB0/Q) is compared with the No. 1 bit of the burst error start address register 151 (BESAB1/Q) as the zero bit of the shift counter 159 (SCNTRB0/Q) is the control term for the No. 1 bit of the burst error start address register 151 (SCNTRB1/Q) at the next clock.

Each bit comparison is implemented with an AND-/OR inverter. Thus for burst error correction beginning No. 1:

The feedback term in the shift counter 151 is:

SCNTRB6/Q + SCNTRB9/Q is implemented with AND/OR inverters giving SCTRBOJ No. 1 and SCTRBOJ No. 1- These terms are compared with BESAB0/Q and BESAB0/Q-.

BECB No. 12 = BESAB0/Q + SCTRBOJ No. 1

The comparison between the shift counter 159 and $$BECB\ \#1 = \overline{\begin{bmatrix} SCNTRB0/Q \cdot BESAB0/Q- \\ + \\ SCNTRB0/Q- \cdot BESAB0/Q \end{bmatrix}}$$

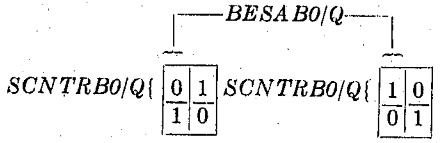

BECB No. 1−     BECB No. 1

Complementing:

the burst error start address register 151 is enabled by a non-zero burst length count (BLCEQZ-). When a match occurs during the SCRDOD, BLCEQZ- is true. Then the burst length decrement (BLCDEC) flip-flop is set. This is shown in the timing diagram of FIG. 24 and the logic shown in FIG. 25.

The burst length decrement flip-flop enables the burst length counter to count down from 15. The BLCDEC/J term is Exclusive OR'd with BLCDEC/Q to produce a burst error window (BEW) control signal. When the burst length counter reaches a count of one, the "K" input to the BLCDEC/Q flip-flop is enabled. The next clock resets the flip-flop and decrements the burst length counter to zero.

The burst error window signal also goes false at this time. When the burst error window signal is high, the burst error correction flip-flop shown in FIG. 26 is controlled for valid burst errors by the parity word generator. The equation for controlling the burst error correction flip-flop shown in FIG. 26 is as follows:

BEC0RR = RDDMP · (BCEQ1) · CWE/Q- · BEW · PWGB14/Q

For correctable burst errors, when the following signals are true (BCEQ1 and CWE/Q-) the burst error window signal allows bit 14 of the parity word generator to control the burst error correction flip-flop shown in FIG. 26. Bit 14 of the parity word generator is used to maintain the necessary one bit look-ahead. The contents of the parity word generator are circulated in synchronism with the data as it is shifted out of the track buffer during dumping. The pattern of parity errors determines the bits to be corrected corresponding to the time of the burst error as shown in the timing chart in FIG. 24.

During read dumping, the contents of the read register are shifted through the read data output data network shown in FIG. 27. The burst error correction flip-flop shown in FIG. 26 and the single bit error correction flip-flop are never set at the same time. For burst errors, the output of the data shift register 159 as shown in FIG. 18 is complemented when the burst error correction flip-flop shown in FIG. 26 is set to 1.

The end result of all the burst error logic is to correct only those bits found in error during a burst error condition. This logic is triggered by the first track data error signal during read filling. Sixteen cell times are interrogated for errors, three before the track data error goes true and 13 after the track data error goes true.

The check word error flip-flop (CWE/Q) is set for a nonzero error syndrome as shown in FIG. 28. The equation for determining the check word error flip-flop signal is shown as follows:

CWE/J = BLCEQZ · SC538P · CWGERB · (CMDB1 · CMDB2- · STAT1- · STAT2)

Should the nonzero burst length count signal (BLCEQZ) be false, then the check word error flip-flop is held false by the "K" terms as shown in FIG. 28. Thus, the check word error flip-flop is never set for any burst error conditions.

For single bit error conditions, the error syndrome is multiplied in the check word generator with each shift until the error locator value is present. This value is $1163_8$. At that point in the read dumping operation, the erroneous bit is at the output of the shift register 51 in FIG. 2. One bit look-ahead is required for the single bit error correction flip-flop (SBEC0RR/Q) as shown in FIG. 29. Also, two different look-ahead conditions are required. If the erroneous bit is the first one in the shift register (data bit "0") then the look-ahead must be developed during read filling at shift register 538 parity bit. The schematic for determining this look-ahead is shown in FIG. 30 with the check word generator shown therein with the Exclusive OR requirement shown between bits 2 and 3. The locator value with look-ahead for data bits 1–511 is $0147_8$. The simplified logic structure for both of these conditions is shown in FIG. 31. The implementation is shown in more detail in FIG. 29.

Figure 2:
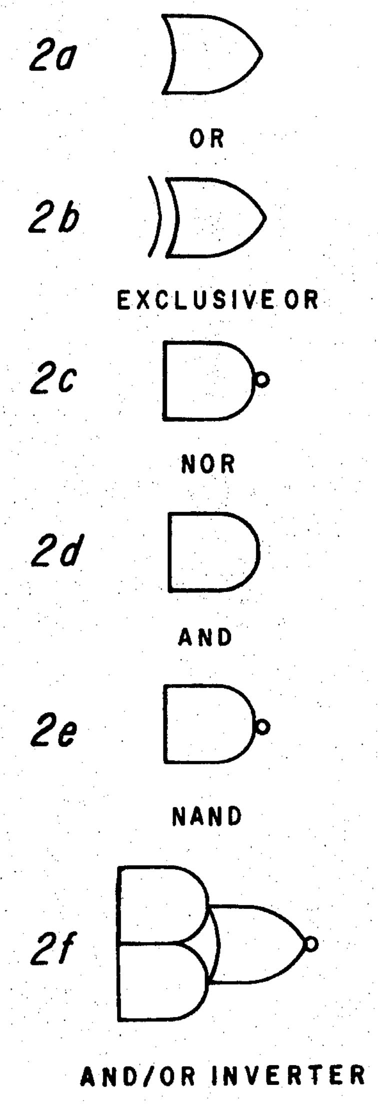

The parity error bit counter (PEBCT) is shown in FIG. 2 and is used as an additional check on single bit error conditions. Two or more remote single bit errors will produce a nonzero error syndrome. This error condition is uncorrectable. If these errors are not 16 bits apart, there will be more than two parity errors. Should there be a single error, then only one parity error bit will be set.

The parity error bit counter is a two bit counter that counts error bits as they are shifted into the parity word generator during read parity word time.

PEBCEnable = Read · Filling · SC512 → 527 · PEBC No. 2

PEBCTBO is toggled by the term PWGB15/Q ⊕ RMID.

The single bit error correction flip-flop shown in FIG. 29 is set by the following function:

SBEC0RR/J = (CWGERL) · (PEBCT No. 2) · (Burst Connt = 0) · (RDDMP)

Since the error locator (ERL) is only true for one cell term, the "K" term can reset a single bit error correction flip-flop shown in FIG. 29 at the next clock pulse according to the following equation:

SBECORR/K = CWGRST + (SBECORR/Q · RDDMP)

When the single bit error correction flip-flop is set, the data at the output of the shift register 51 in FIG. 2 is complemented in the same way that erroneous error bits are corrected as shown in FIG. 27.

Two signals represent the status of the error detection/correction logic as shown in FIG. 33. Read data error (RDE) indicates that the data read from the disc are errors that cannot be corrected. Read error correction (REC) indicates that error correction logic has been employed. Four terms compose the RDE signal:

Burst error correction check error (BECCE)
Burst count equals two (BCEQ2)
Burst length count equals 15 (BLCEQ15)
Uncorrect single bit error (USBE)

The BECCE term indicates an erroneously corrected burst error and is developed during read dumping. This term is developed as follows:

BECCE = Burst Count = 1 · CWG Error · SC538P

Multiple burst errors will cause the burst counter to increment to a count of two and then stop.

Should the burst error occur in the parity or check word, the burst length counter will be set to a count of 15 after shift register bit pulse 511 during read dumping. When this happens, the data is flagged as having a read data error.

When multiple single bit errors occur, the LSB of the parity error bit counter will be set. This and the check word error signal (CWE/Q) true constitute an unsuccessful burst error correction.

Read data error is enabled during Full and Dumping and has the following equation:

RDE = (STAT2-) (BECCE + BCEQ2 + BLCEQ15 + USBE)

The read error correction (REC) logic in FIG. 33 indicates that some portion of error correction logic has been employed. A burst count of 1 (BCEQ1) will be present when the burst error correction logic is activated. A single bit error (SBE) correction is made when the check word error flip-flop is set and there is a single parity error bit so that the PEBCB/Q is true.

The two status lines shown in FIG. 33 have the following combined truth table:

| REC | RDE | |
|---|---|---|
| 0 | 0 | Good Data No errors |
| 0 | 1 | Bad data—2 burst errors or too many single bit errors or burst error not in data |
| 1 | 0 | Corrected burst error or single bit error |
| 1 | 1 | Faulty burst error correction |

I claim:

1. In a data communication system, the combination including a source of data signals, said data signals divided into predetermined segments of binary data,
a shift register,
means to shift a data segment into said shift register,
a parity word generator for generating a parity word from a data segment shifted into said shift register,
a shift counter for counting the bits of said data segments shifted into said shift register,
means for indicating a burst error in a data segment,
means responsive to said indicating means for recording the number of burst errors in said data signal,
a burst error address register,
means responsive to an indication of a burst error for transferring the address of the bit in said data segment at the start of said burst error from said shift counter to said burst error address register,
means responsive to said indicating means indicating a burst error and said record means recording only one burst error for correcting the burst error in said data segment at the address indicated in said burst error address register with the parity word generated by said parity word generator, and
means responsive to the correction of a burst error in a data segment for checking said data segment for a single bit error.

2. The combination claimed in claim 1 including means responsive to the detection of a single bit error by said checking means for correcting said single bit error.

3. In a data communication system, the combination including a source of data signals, said data signals divided into predetermined segments of binary data,
a shift register,
means to shift a data segment into said shift register,
a parity word generator for generating a parity word from a data segment shifted into said shift register,
a shift counter for counting the bits of said data segments shifted into said shift register,
means for indicating a burst error in a data segment,
means responsive to said indicating means for recording the number of burst errors in said data signal,
a burst error address register,
means responsive to an indication of a burst error for transferring the address of the bit in said data segment at the start of said burst error from said shift counter to said burst error address register,
means responsive to said indicating means indicating a burst error and said recording means recording only one burst error for shifting said data segment out of said shift register one bit at a time, said shift counter responsive to shift of data bits out of said shift register for counting said bits of data,
means for comparing the count of bits shifted out of said shift counter with the contents of said burst error address register and indicating a match between them,
means responsive to the indication of a match by said comparison means for exclusive oring said data bits and said corresponding parity word to complement said burst errors, and
means responsive to the correction of a burst error in a data segment for checking said data segment for a single bit error.

4. The combination claimed in claim 3 including means responsive to the detection of a single bit error by said checking means for correcting said single bit error.

5. In a data communication system including,
a source of data signals, said data signals divided into predetermined segments of binary data,
a shift register,
means to shift a data segment into said shift register,
a parity word generator for generating a parity word from a data segment shifted into said shift register,
a shift counter for counting the bits of said data segments shifted into said shift register,
means for indicating a burst error in a data segment,
means responsive to said indicating means for recording the number of burst errors in said data signal,
a burst error address register,
means responsive to an indication of a burst error for transferring the address of the bit in said data segment at the start of said burst error from said shift counter to said burst error address register,
means responsive to said indicating means indicating a burst error and said record means recording only one burst error for correcting the burst error in said data segment at the address indicated in said burst error address register with the parity word generated by said parity word generator,
means responsive to the correction of a burst error in a data segment for checking said data segment for a single bit error,
each data segment having an associated parity word and a check word,
a parity word register,
a check word register,
means for shifting the parity word associated with said data segment into said parity word register and the check word associated with said data segment into said check word register,
a parity error bit counter,
a check word generator,
means responsive to the correction of a burst error in said data segment by said correction means for feeding said corrected data segment through said parity word generator and said check word generator for detecting a single bit error,
said parity error bit counter responsive to the detection of a single bit error for indicating the number of single bit errors in said data segment, and
means responsive to the detection of a single bit error for correcting said single bit error in said data segment with said check word generator.

* * * * *